United States Patent
Islam et al.

(10) Patent No.: US 10,237,857 B2
(45) Date of Patent: Mar. 19, 2019

(54) BEAM REFERENCE SIGNAL BASED NARROWBAND CHANNEL MEASUREMENT AND CQI REPORTING

(71) Applicant: QUALCOMM Incorporated, San Diego, CA (US)

(72) Inventors: Muhammad Nazmul Islam, Edison, NJ (US); Tao Luo, San Diego, CA (US); Bilal Sadiq, Basking Ridge, NJ (US); Juergen Cezanne, Ocean Township, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/468,825

(22) Filed: Mar. 24, 2017

(65) Prior Publication Data

US 2017/0303141 A1    Oct. 19, 2017

Related U.S. Application Data

(60) Provisional application No. 62/324,861, filed on Apr. 19, 2016, provisional application No. 62/335,630, filed on May 12, 2016.

(51) Int. Cl.
*H04W 72/00* (2009.01)
*H04W 72/04* (2009.01)
(Continued)

(52) U.S. Cl.
CPC ...... *H04W 72/0413* (2013.01); *H04B 7/0408* (2013.01); *H04B 7/0417* (2013.01);
(Continued)

(58) Field of Classification Search
CPC . H04W 72/0413; H04W 16/28; H04W 72/02; H04W 72/046; H04W 74/0833;
(Continued)

(56) References Cited

U.S. PATENT DOCUMENTS

| 8,848,673 B2 * | 9/2014 | Dinan | H04B 7/0456 |
| | | | 370/335 |
| 2008/0080459 A1 * | 4/2008 | Kotecha | H04B 7/0417 |
| | | | 370/342 |

(Continued)

FOREIGN PATENT DOCUMENTS

| EP | 1816815 A1 * | 8/2007 | ......... H04L 25/0226 |
| EP | 1816815 A1 * | 8/2007 | ......... H04L 25/0226 |

(Continued)

OTHER PUBLICATIONS

International Search Report and Written Opinion—PCT/US2017/024346—ISA/EPO—dated Jun. 16, 2017.

*Primary Examiner* — Mahendra Patel
(74) *Attorney, Agent, or Firm* — Arent Fox LLP

(57) ABSTRACT

When beamforming (e.g., via a millimeter wave system (mmW)) is used for wireless communication, a base station may transmit beams that are directed to certain directions. Due to the directional nature of the beams in the mmW system, an approach to determine a beam that provides a desirable gain is studied. The apparatus may be a user equipment (UE). The apparatus receives, from a base station, a plurality of signals through a plurality of beams of the base station, each of the plurality of beams corresponding to a respective antenna port of a plurality of antenna ports of the base station. The apparatus performs channel estimation for each beam of the plurality of beams from the plurality of antenna ports based on the plurality of signals. The apparatus transmits, to the base station, a feedback signal including information about one or more beams selected from the (Continued)

plurality of beams, the feedback signal further including one or more candidate uplink precoders.

23 Claims, 18 Drawing Sheets

(51) Int. Cl.
| | |
|---|---|
| *H04B 7/0408* | (2017.01) |
| *H04B 7/0417* | (2017.01) |
| *H04L 5/00* | (2006.01) |
| *H04L 25/02* | (2006.01) |
| *H04W 72/02* | (2009.01) |
| *H04B 7/06* | (2006.01) |
| *H04B 17/336* | (2015.01) |
| *H04W 16/28* | (2009.01) |
| *H04B 7/08* | (2006.01) |
| *H04W 74/08* | (2009.01) |

(52) U.S. Cl.
CPC ......... *H04B 7/0626* (2013.01); *H04B 7/0632* (2013.01); *H04B 7/0639* (2013.01); *H04B 7/0695* (2013.01); *H04B 7/088* (2013.01); *H04B 17/336* (2015.01); *H04L 5/0048* (2013.01); *H04L 5/0053* (2013.01); *H04L 25/0204* (2013.01); *H04W 16/28* (2013.01); *H04W 72/02* (2013.01); *H04W 72/046* (2013.01); *H04W 74/0833* (2013.01)

(58) Field of Classification Search
CPC .. H04B 17/336; H04B 7/0408; H04B 7/0417; H04B 7/0626; H04B 7/0695; H04B 5/088; H04B 7/6017; H04B 7/0639; H04B 7/0456; H04B 7/088; H04L 5/0048; H04L 5/0053; H04L 25/0204
USPC ................ 455/450, 509, 522; 370/311, 329
See application file for complete search history.

(56) References Cited

U.S. PATENT DOCUMENTS

| | | | |
|---|---|---|---|
| 2009/0322613 A1 | 12/2009 | Bala et al. | |
| 2010/0284359 A1* | 11/2010 | Kim | H04B 7/024 |
| | | | 370/329 |
| 2011/0141928 A1 | 6/2011 | Shin et al. | |
| 2011/0164700 A1* | 7/2011 | Porat | H04B 7/0417 |
| | | | 375/267 |
| 2011/0205930 A1* | 8/2011 | Rahman | H04B 7/0417 |
| | | | 370/252 |
| 2011/0249637 A1* | 10/2011 | Hammarwall | H04B 7/0634 |
| | | | 370/329 |
| 2013/0059619 A1* | 3/2013 | Kim | H04W 72/046 |
| | | | 455/509 |
| 2013/0064129 A1* | 3/2013 | Koivisto | H04B 7/0621 |
| | | | 370/252 |
| 2013/0083744 A1* | 4/2013 | Peng | H04W 52/04 |
| | | | 370/329 |
| 2013/0083774 A1* | 4/2013 | Son | H04W 36/0055 |
| | | | 370/331 |
| 2013/0148600 A1* | 6/2013 | Moulsley | H04B 7/024 |
| | | | 370/329 |
| 2013/0242773 A1* | 9/2013 | Wernersson | H04B 7/024 |
| | | | 370/252 |
| 2013/0322280 A1* | 12/2013 | Pi | H04W 72/0413 |
| | | | 370/252 |
| 2014/0044044 A1 | 2/2014 | Josiam et al. | |
| 2014/0098912 A1* | 4/2014 | Yin | H04B 7/0417 |
| | | | 375/345 |
| 2014/0146863 A1* | 5/2014 | Seol | H04B 7/0456 |
| | | | 375/224 |
| 2014/0162717 A1* | 6/2014 | Liu | H04W 52/146 |
| | | | 455/522 |
| 2014/0169493 A1* | 6/2014 | Hammarwall | H04B 7/0634 |
| | | | 375/267 |
| 2014/0192917 A1* | 7/2014 | Nam | H04B 7/0417 |
| | | | 375/267 |
| 2014/0211731 A1 | 7/2014 | Inoue et al. | |
| 2014/0219152 A1* | 8/2014 | Anto | H04W 52/08 |
| | | | 370/311 |
| 2014/0307818 A1* | 10/2014 | Jindal | H04W 28/0215 |
| | | | 375/267 |
| 2014/0349693 A1 | 11/2014 | Kim et al. | |
| 2015/0049824 A1* | 2/2015 | Kim | H04B 7/0456 |
| | | | 375/267 |
| 2015/0110210 A1* | 4/2015 | Yang | H04B 7/0417 |
| | | | 375/267 |
| 2015/0341097 A1* | 11/2015 | Yang | H04B 7/0617 |
| | | | 370/329 |
| 2015/0382205 A1* | 12/2015 | Lee | H04B 7/0417 |
| | | | 370/329 |
| 2016/0006549 A1 | 1/2016 | Kim et al. | |
| 2016/0028519 A1* | 1/2016 | Wei | H04B 7/0456 |
| | | | 375/267 |
| 2016/0043781 A1 | 2/2016 | Cho et al. | |
| 2016/0080051 A1* | 3/2016 | Sajadieh | H04B 7/0456 |
| | | | 375/267 |
| 2016/0134352 A1* | 5/2016 | Stirling-Gallacher | ...... |
| | | | H04B 7/0639 |
| | | | 370/329 |
| 2016/0212643 A1 | 7/2016 | Park et al. | |
| 2017/0244462 A1* | 8/2017 | Wei | H04B 7/0469 |
| 2017/0302354 A1 | 10/2017 | Islam et al. | |
| 2017/0303263 A1 | 10/2017 | Islam et al. | |
| 2018/0091207 A1* | 3/2018 | Kakishima | H04B 7/0626 |
| 2018/0175995 A1 | 6/2018 | Koorapaty et al. | |

FOREIGN PATENT DOCUMENTS

| | | | | |
|---|---|---|---|---|
| WO | 2013137794 A1 | 9/2013 | | |
| WO | 2014117352 A1 | 8/2014 | | |
| WO | WO 2014117352 A1 * | 8/2014 | ......... | H04B 7/0456 |
| WO | WO-2014117352 A1 * | 8/2014 | ......... | H04B 7/0456 |
| WO | 2015080648 A1 | 6/2015 | | |
| WO | WO-2016070706 A1 * | 5/2016 | ......... | H04B 7/0639 |
| WO | WO 2017043883 A1 * | 3/2017 | ............... | H04B 7/04 |
| WO | WO-2017043883 A1 * | 3/2017 | ............... | H04B 7/04 |

* cited by examiner

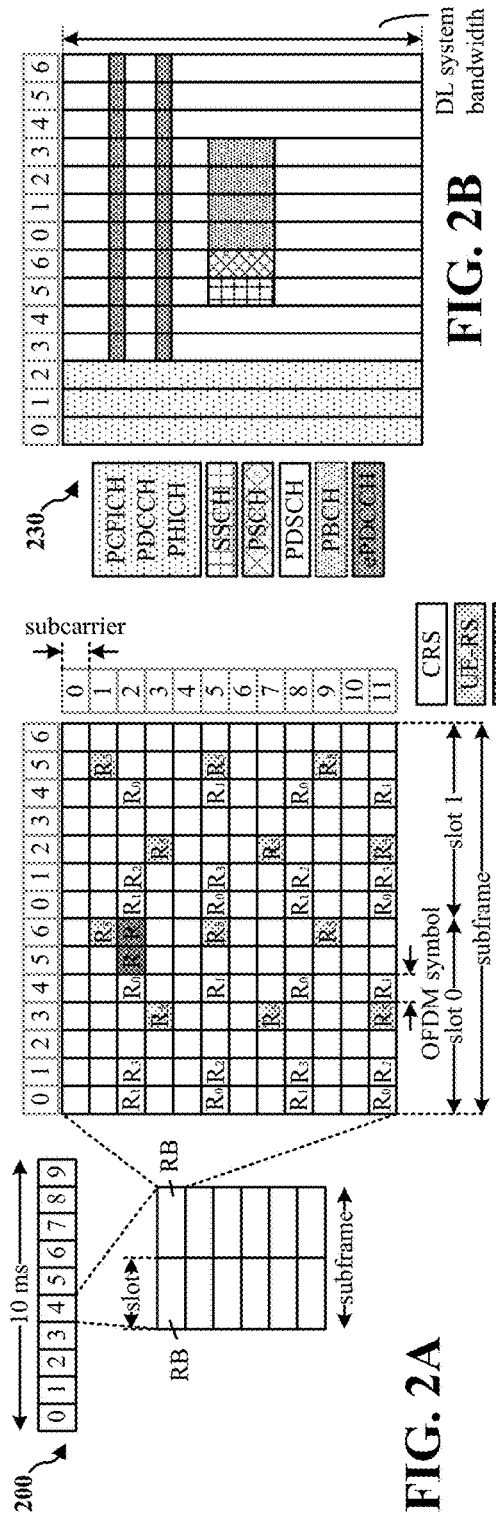
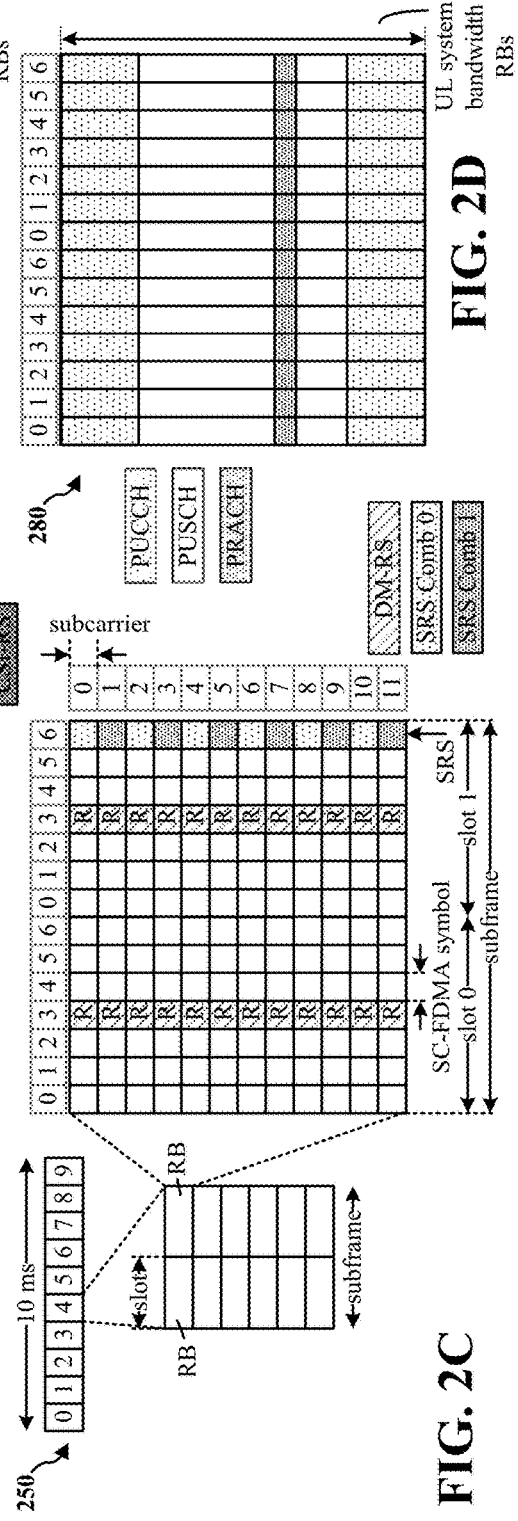
FIG. 2A
FIG. 2B
FIG. 2C
FIG. 2D

BEAM REFERENCE SIGNAL BASED NARROWBAND CHANNEL MEASUREMENT AND CQI REPORTING

CROSS-REFERENCE TO RELATED APPLICATION(S)

This application claims the benefit of U.S. Provisional Application Ser. No. 62/324,861, entitled "BEAM REFERENCE SIGNAL BASED NARROWBAND CHANEL MEASUREMENT AND CQI REPORTING" and filed on Apr. 19, 2016, and U.S. Provisional Application Ser. No. 62/335,630, entitled "BEAM REFERENCE SIGNAL BASED NARROWBAND CHANEL MEASUREMENT AND CQI REPORTING" and filed on May 12, 2016, which are expressly incorporated by reference herein in their entirety.

BACKGROUND

Field

The present disclosure relates generally to communication systems, and more particularly, to wireless communication using a narrowband wave such as a millimeter wave.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a millimeter wave system (mmW) is used for wireless communication, a base station may transmit beams that are transmitted in certain directions. Due to the directional nature of the beams in the mmW system, an approach to determine a beam direction that provides a desirable gain is desirable.

In an aspect of the disclosure, a method, a computer-readable medium, and an apparatus are provided. The apparatus may be a user equipment (UE) for wireless communication. The apparatus receives, from a base station, a plurality of signals through a plurality of beams of the base station, each of the plurality of beams corresponding to a respective antenna port of a plurality of antenna ports of the base station. The apparatus performs channel estimation for each beam of the plurality of beams from the plurality of antenna ports based on the plurality of signals. The apparatus transmits, to the base station, a feedback signal including information about one or more beams selected from the plurality of beams, the feedback signal further including one or more candidate uplink precoders.

In an aspect, the apparatus may be a UE for wireless communication. The apparatus includes means for receiving, from a base station, a plurality of signals through a plurality of beams of the base station, each of the plurality of beams corresponding to a respective antenna port of a plurality of antenna ports of the base station. The apparatus includes means for performing channel estimation for each beam of the plurality of beams from the plurality of antenna ports based on the plurality of signals. The apparatus includes means for transmitting, to the base station, a feedback signal including information about one or more beams selected from the plurality of beams, the feedback signal further including one or more candidate uplink precoders.

In an aspect, the apparatus may be a UE for wireless communication including a memory and at least one processor coupled to the memory. The at least one processor is configured to: receive, from a base station, a plurality of signals through a plurality of beams of the base station, each of the plurality of beams corresponding to a respective antenna port of a plurality of antenna ports of the base station, perform channel estimation for each beam of the plurality of beams from the plurality of antenna ports based on the plurality of signals, and transmit, to the base station, a feedback signal including information about one or more beams selected from the plurality of beams, the feedback signal further including one or more candidate uplink precoders.

In an aspect, a computer-readable medium storing computer executable code for wireless communications by a UE, includes code to: receive, from a base station, a plurality of signals through a plurality of beams of the base station, each of the plurality of beams corresponding to a respective antenna port of a plurality of antenna ports of the base station, perform channel estimation for each beam of the plurality of beams from the plurality of antenna ports based on the plurality of signals, and transmit, to the base station, a feedback signal including information about one or more beams selected from the plurality of beams, the feedback signal further including one or more candidate uplink precoders.

In another aspect of the disclosure, a method, a computer-readable medium, and an apparatus are provided. The apparatus may be a base station for wireless communication. The apparatus transmits, to a UE, a plurality of signals through a plurality of beams of the base station, each of the plurality of beams corresponding to a respective antenna port of a plurality of antenna ports of the base station. The apparatus receives, from the UE, a feedback signal including information about one or more beams selected from the plurality of beams. The apparatus schedules a PUSCH based on the feedback signal.

In an aspect, the apparatus may be a base station for wireless communication. The apparatus includes means for transmitting, to a UE, a plurality of signals through a plurality of beams of the base station, each of the plurality of beams corresponding to a respective antenna port of a plurality of antenna ports of the base station. The apparatus includes means for receiving, from the UE, a feedback signal including information about one or more beams selected from the plurality of beams. The apparatus includes means for scheduling a PUSCH based on the feedback signal.

In an aspect, the apparatus may be a base station for wireless communication including a memory and at least one processor coupled to the memory. The at least one processor is configured to: transmit, to a UE, a plurality of signals through a plurality of beams of the base station, each of the plurality of beams corresponding to a respective antenna port of a plurality of antenna ports of the base station, receive, from the UE, a feedback signal including information about one or more beams selected from the plurality of beams, and schedule a PUSCH based on the feedback signal.

In an aspect, a computer-readable medium storing computer executable code for wireless communications by a base station, includes code to: transmit, to a UE, a plurality of signals through a plurality of beams of the base station, each of the plurality of beams corresponding to a respective antenna port of a plurality of antenna ports of the base station, receive, from the UE, a feedback signal including information about one or more beams selected from the plurality of beams, and schedule a PUSCH based on the feedback signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
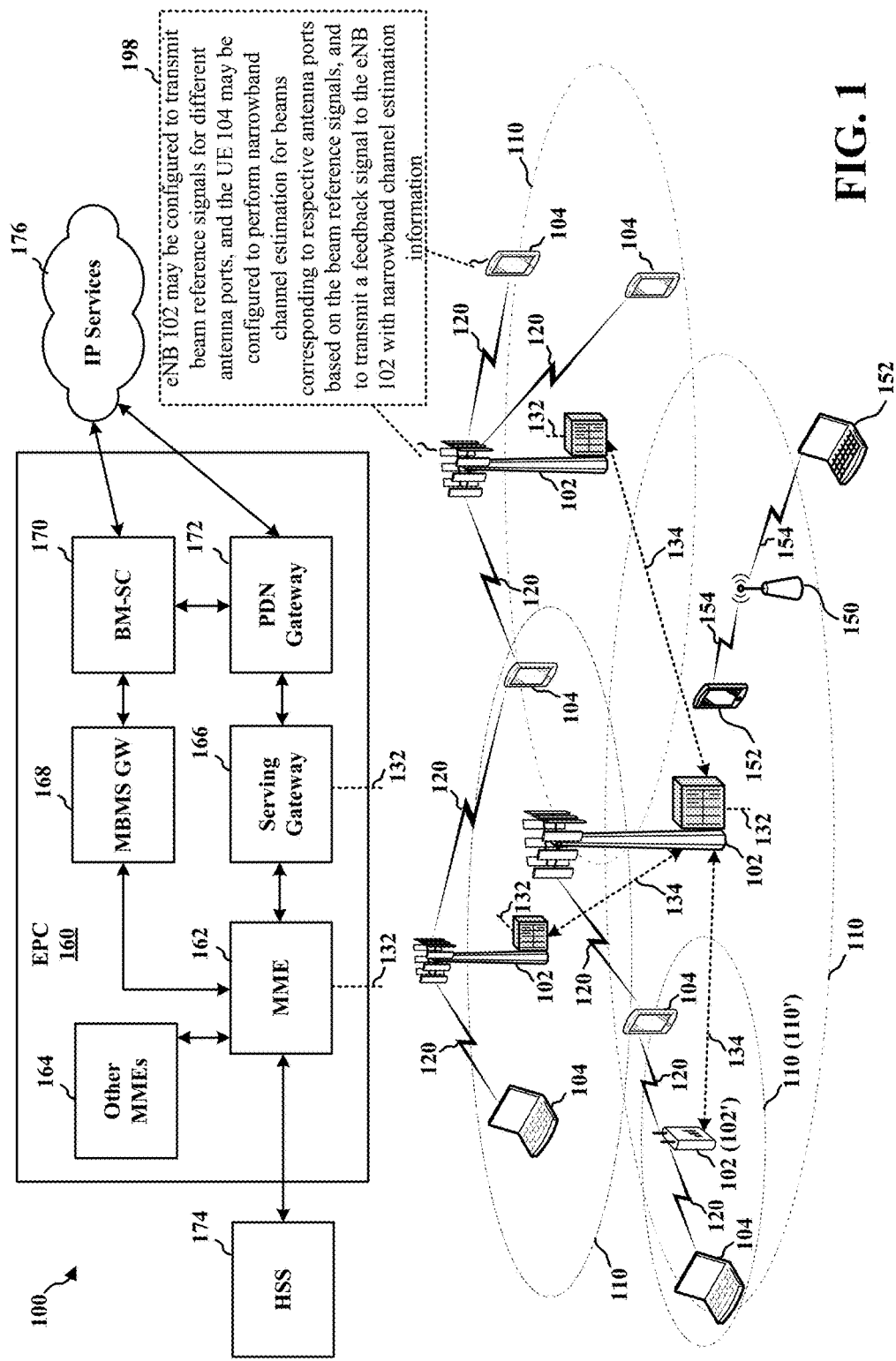
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to transmit beam reference signals for different antenna ports, and the UE 104 may be configured to perform narrowband channel estimation for beams corresponding to respective antenna ports based on the beam reference signals, and to transmit a feedback signal to the eNB 102 with narrowband channel estimation information (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
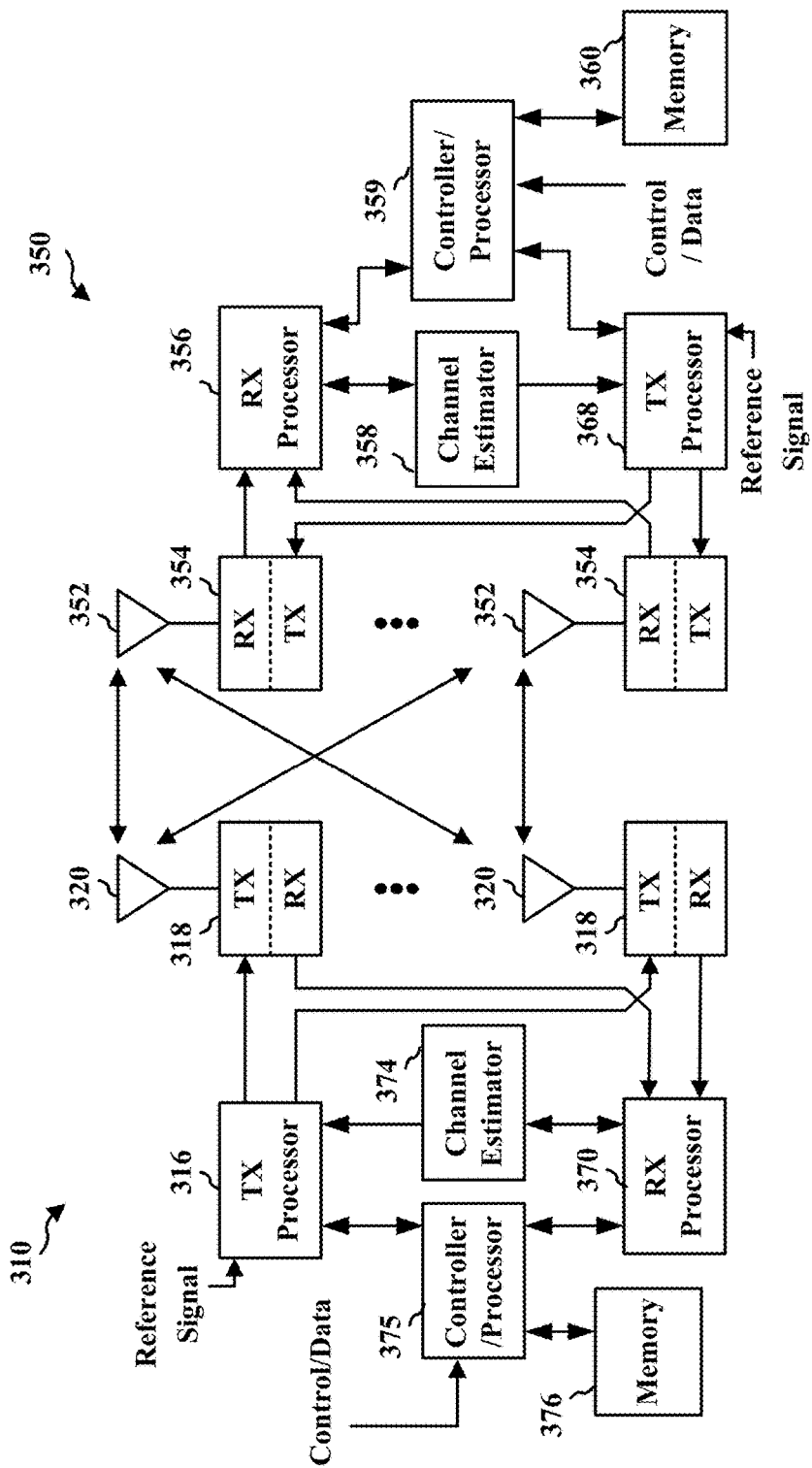
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Wireless communication systems may employ narrow bandwidths and high frequency carriers. For example an mmW system may be utilized for wireless communication at a high transmission rate (e.g., transmitting frequently). In mmW systems, when the carrier frequency is high (e.g., 28 GHz), path loss may be high. For example, the carrier frequency for mmW communication may be 10 times higher than a carrier frequency for other types of wireless communication. Thus, for example, the mmW system may experience path loss that is approximately 20 dB higher than other types of wireless communication cases at lower frequencies. To mitigate the higher path loss in mmW systems, a base station may perform transmission in a directional manner by beam-forming the transmission to focus the transmission in a particular direction.

If the carrier frequency for wireless communication is a higher frequency, the wavelength of the carrier is shorter. A shorter wavelength may allow a higher number of antennas to be implemented within a given antenna array length than a number of antennas that can be implemented when a lower carrier frequency is used. Therefore, in the mmW system (using a higher carrier frequency), a higher number of antennas may be used in a base station and/or a UE. For example, the BS may have 128 or 256 antennas and the UE may have 8, 16 or 24 antennas. With the higher number of antennas, a beam-forming technique may be used to digitally change the direction of a beam by applying different phases to different antennas. Because beam-forming in an mmW system may provide a narrow beam with increased gain at the receiver, the base station may utilize the narrow beam to transmit a synchronization signal in various directions using multiple narrow beams to provide coverage over a wider area.

One challenge in using beam-forming for a mmW system arises from the directional nature of a beam-formed beam. In such a case, for a UE to obtain a desirable gain, the base station needs to point the beam directly at the UE such that the direction of the beam aligns with the location of the UE. If the direction of the beam is not aligned properly, the antenna gain at the UE may be undesirably low (e.g., resulting in low SNR, high block error rates, etc.). Further, when the UE enters the mmW system and receives transmitted data from the base station over the mmW, the base station should be able to determine the best beam(s) for mmW communication with the particular UE. Thus, the base station may transmit beam reference signals (BRSs) in various directions via corresponding beams so that the UE may identify the best beam of the one or more beams received from the base station based on measurements on the BRSs. In the mmW communication, the base station may also transmit a primary synchronization signal (PSS), a secondary synchronization signal (SSS), an extended synchronization signal (ESS), and PBCH signals for synchronization and for broadcasting system information. In the mmW communication, such signals may be transmitted directionally via multiple beams.

Figure 4B:
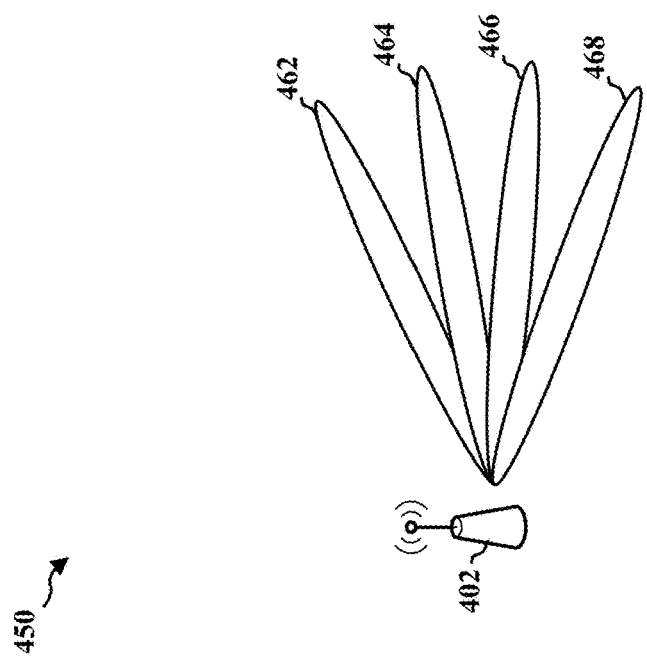
FIG. 4B is an example diagram illustrating transmission of beams in another symbol.
Figure 4A:
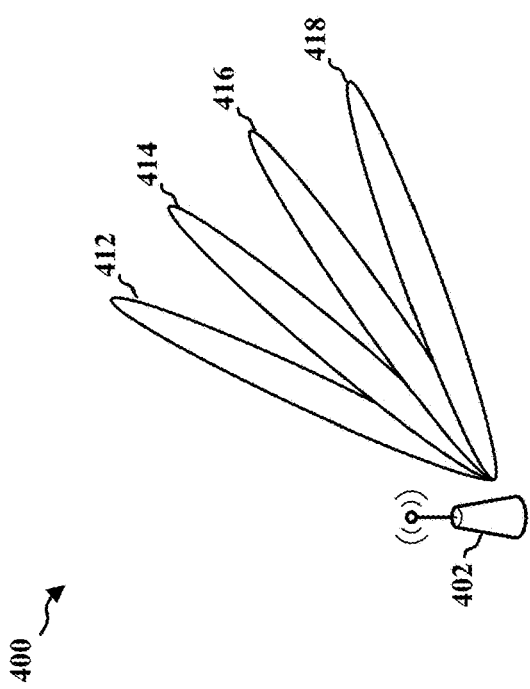
FIG. 4A is an example diagram illustrating transmission of beams in one symbol.

If there are multiple antenna ports (multiple sets of antennas) in the base station, the base station may transmit multiple beams per symbol. For example, the base station may use multiple antenna ports in a cell specific manner in a first symbol of a synchronization subframe to sweep in multiple directions. The base station may then sweep in multiple directions using the multiple antenna ports in a cell specific manner in another symbol of the synchronization sub-frame. Each antenna port may include a set of antennas. For example, an antenna port including a set of antennas (e.g., 64 antennas) may transmit one beam, and multiple antenna ports may transmit multiple beams respectively, each in a different direction. Thus, if there are four antenna ports, the four antenna ports may sweep through four directions (e.g., transmit four beams in four different directions). FIGS. 4A and 4B show example diagrams illustrating the base station sweeping in multiple directions in a first symbol and a second symbol, respectively. As shown in FIGS. 4A and 4B, the base station may sweep in different directions in each symbol, e.g., the angular/directional range of the beams for the example in FIG. 4A is different from the angular/directional range of the beams for the example in FIG. 4B. FIG. 4A is an example diagram 400 illustrating transmission of beams in a first symbol. A base station 402 in the example diagram 400 has four antenna ports, and may transmit four beams 412, 414, 416, and 418 in four different directions in the first symbol. FIG. 4B is an example diagram 450 illustrating transmission of beams in a second symbol. Since the base station 402 has four antenna ports, four beams 462, 464, 466, and 468 may be transmitted in four different directions in the second symbol. The beams transmitted by the base station during the same symbol may not be adjacent with each other.

Figure 5:
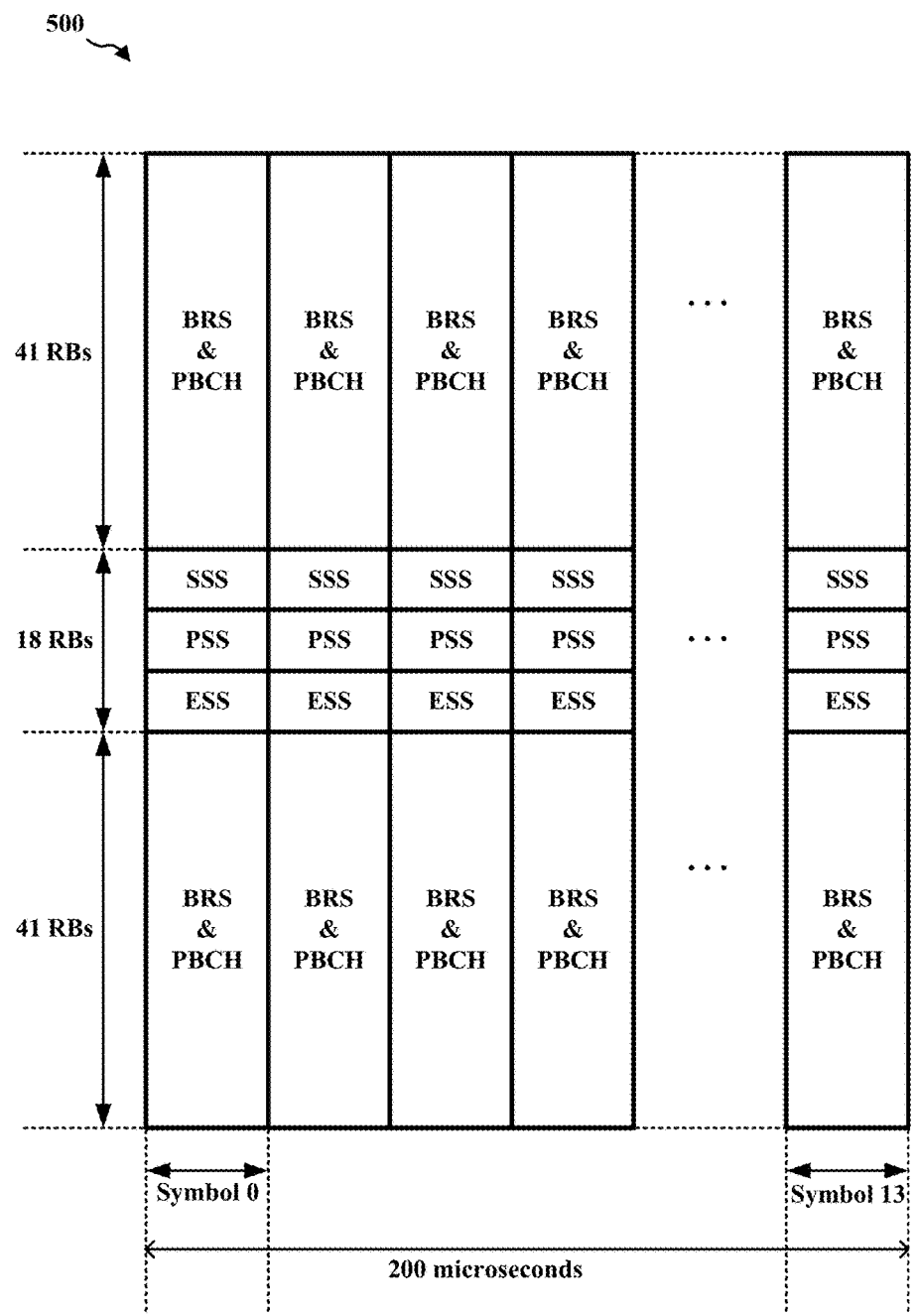
FIG. 5 is an example diagram illustrating a subframe structure for synchronization in a millimeter wave communication system.

FIG. 5 is an example diagram 500 illustrating a synchronization subframe structure for a millimeter wave communication system. The synchronization subframe may be divided into 14 symbols, e.g., from symbol 0 to symbol 13. Within each symbol, 100 subcarriers may be transmitted, where the first 41 RBs are used to carry BRSs and PBCHs, the next 18 RBs may be used to carry an SSS, a PSS, and an ESS, and the next 41 RBs may be used to carry BRSs and PBCHs.

The beam transmitted by each antenna port may change from symbol to symbol. As discussed above, for example, for a first symbol, four beams from four antenna ports of the base station may cover a first angular range (e.g., as illustrated in FIG. 4A), while four beams from the four antenna ports may cover a second angular range for a different symbol (e.g., as illustrated in FIG. 4B). For example, the base station may have 1, 2, 4, or 8 active antenna ports. Within each symbol, the base station may transmit, to the UE, one or more of a PSS, an SSS, an ESS, a PBCH, and a BRS on each subcarrier. Each of the PSS, the ESS, the SSS, and the PBCH may be transmitted by all antenna ports of the base station on the same subcarriers throughout different symbols of the synchronization subframe. The PSS and SSS may be used to obtain the cell identity and the subframe level synchronization. However, PSS and SSS may not provide sufficient information to identify a symbol of the subframe. Therefore, the ESS may be used to indicate a particular symbol. The contents of the ESS may change from symbol to symbol. Therefore, the ESS may be used to indicate a symbol, in order to enable the UE to identify a particular symbol index within the subframe. For example, for each received beam at the UE, the UE may identify the received beam based on a BRS received from the base station via the received beam, and may identify a symbol for the received beam based on an ESS received via the received beam. The ESS may be similar in structure with other synchronization signals such as the PSS and the SSS. For example, the ESS as well as the PSS may be based on a Zadoff Chu sequence (e.g., a Zadoff Chu sequence with length 71). However, unlike the PSS, the Zadoff Chu sequence of each ESS may be cyclically shifted by a different amount, depending on the particular symbol. For example, for each different symbol, the base station cyclically shifts the Zadoff Chu sequence by a different amount to generate a different ESS for each different symbol. When the UE receives the ESS, the UE may determine the symbol index based on the amount of the cyclic shift of the Zadoff Chu sequence of the ESS. If more than one base station, each in different cells, transmit ESSs, the UE may not be able to determine which base station transmitted the ESS. Thus, the Zadoff Chu sequence in the ESS may include cell-specific roots (e.g., for the corresponding base station) that are specific to a particular cell. The cell-specific roots, may enable the UE to identify which base station transmitted the ESS. The Zadoff Chu sequence in the ESS may also be scrambled using a cell-specific sequence, such that the UE may be able to identify which base station transmitted the ESS, based on the cell-specific sequence.

In an aspect, the angular space of the coverage area of a cell may be divided into three sectors, where each sector covers 120 degrees. A base station may provide coverage for one or more sectors. Each symbol of the synchronization subframe may be associated with a different range in direction/angle. For example, the 14 symbols may collectively cover 120 degrees (one sector). In one example, when there are 14 symbols (thus 14 direction ranges) per subframe and there are 4 antenna ports, the base station may transmit beams in 56 (14×4) different directions. In another example, the symbols within a subframe may cover the angular range more than once. In such an example, if there are 14 symbols within a subframe, the first seven symbols may cover 120 degrees, and then the next seven symbols may cover the same 120 degrees.

Figure 6:
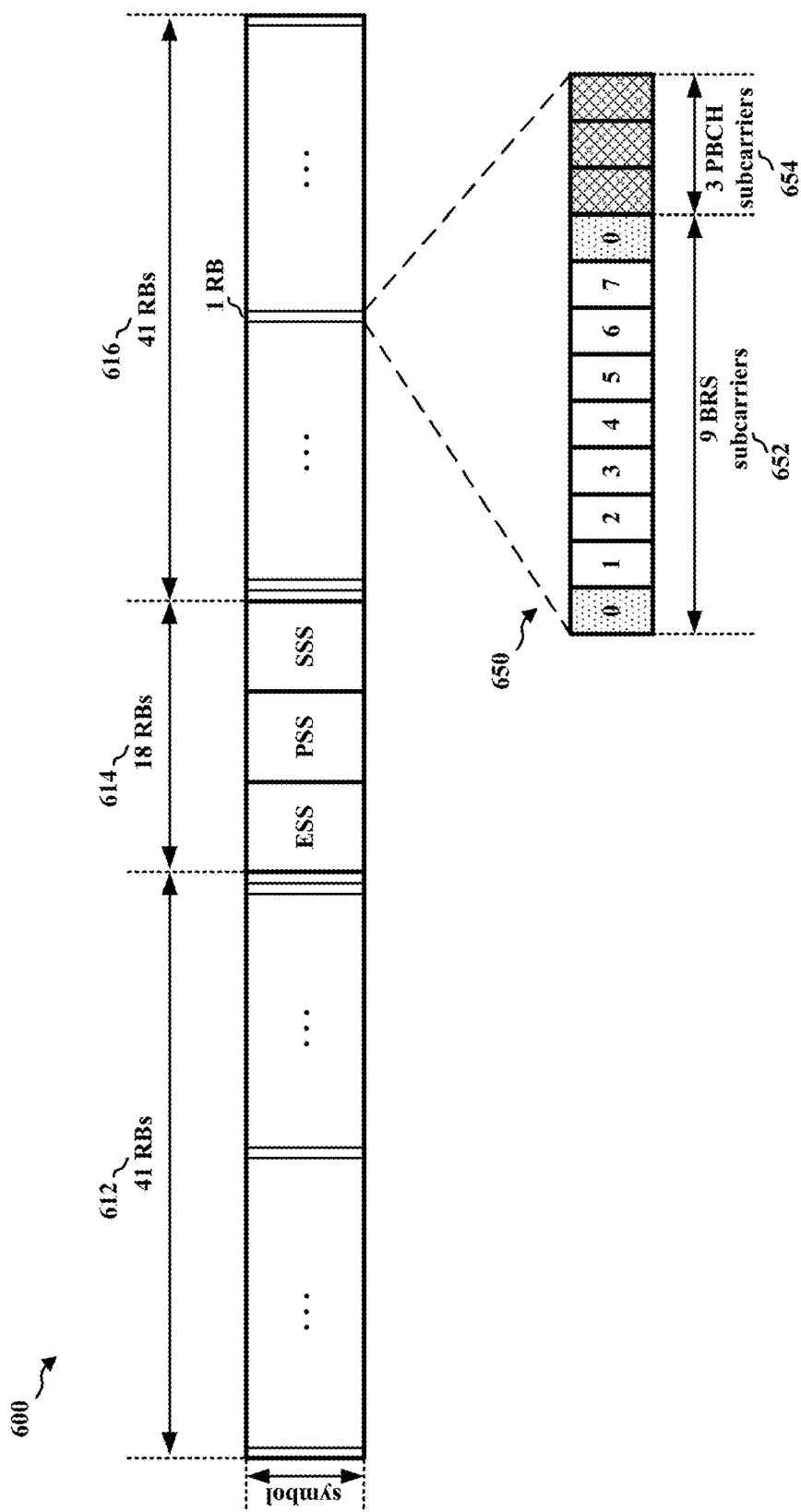
FIG. 6 is an example diagram illustrating resource block usage within one symbol in a subframe for millimeter wave communication.

FIG. 6 is an example diagram 600 illustrating resource block usage within one symbol of a subframe for millimeter wave communication. A first set of RBs (612) may be used to carry BRSs and PBCHs, a second set of RBs (614) may be used to carry an SSS, a PSS, and an ESS, and a third set of RBs (616) may be used to carry BRSs and PBCHs. For example, each RB in the first set of RBs (612) and the third set of RBs (616) may have 12 subcarriers, as shown in an example diagram 650. In particular, as shown in the example diagram 650, each RB may include 12 subcarriers, where BRS subcarriers 652 are used to transmit BRSs and PBCH subcarriers 654 are used to transmit a PBCH.

When the UE receives the BRS from the base station, the UE may perform channel estimation based on the BRS, where the channel estimate is used to decode the PBCH. The UE may also use the BRS to perform wideband channel estimation for each beam and/or to perform narrowband channel estimation for each beam (e.g., when the beam is used for mmW communication).

The base station may transmit the BRS using each of multiple antenna ports of the base station, by separate subcarriers that are frequency-division multiplexed for multiple antenna ports and/or by subcarriers carrying code-division multiplexed information for multiple antenna ports. Each BRS may have the same structure, and thus the BRSs for all beams may have the same structure. For example, the BRS may be a pseudo-random sequence initialized with a cell-specific number. Thus, to enable the UE to determine which BRS corresponds to which beam, subcarriers carrying the BRSs from different beams from respective antenna ports may be frequency-division multiplexed or code-division multiplexed (e.g., using orthogonal cover codes). In an aspect, each BRS may correspond to a respective antenna port. In particular, if the disjoint subcarriers are frequency-division multiplexed for multiple antenna ports, each of the BRS subcarriers corresponds to a respective antenna port. For example, information on eight antenna ports (antenna ports #0-#7) may be frequency-division multiplexed onto 8 subcarriers (e.g., by the base station) as BRS subcarriers in an RB. In such an example, the remaining four subcarriers in the RB may be used to transmit a PBCH on the PBCH subcarriers. If the code-division multiplexed information is used for multiple antenna ports, information on the BRS antenna ports are code-division multiplexed on all BRS subcarriers. For example, information on eight antenna ports (antenna ports #0-#7) may be code-division multiplexed onto all 9 BRS subcarriers, e.g., based on either a Hadamard matrix or a discrete Fourier transform (DFT) matrix of length 8. In another aspect, BRSs may be different in structure for different beams within a symbol. In such an aspect, the BRS may be a pseudo-random sequence initialized with a combination of a cell-specific number and a beam-specific number.

When the UE receives different beams from different antenna ports of the base station per symbol, the UE may perform channel estimation (e.g., narrowband channel estimation) on the received beams based on the BRSs corresponding to the received beams, where each received beam corresponds to a respective BRS, and the channel estimation is performed on each beam. For example, because the beams for the mmW communication are directional, some beams may not align with the UE, and thus the narrowband channel measurement for the BRSs corresponding to such beams may be low. On the other hand, narrowband channel measurement for a BRS corresponding to a beam that align with the UE may be high. The channel estimation may be based on measurement of at least one of one of a signal-to-noise ratio, an antenna gain, or a reference signal measurement (e.g., reference signal receive power and/or reference signal received quality) of each received beam, based on a corresponding BRS of the received beam. For example, the UE may rank the received beams based on the narrowband channel estimation of each received beam, where the received beams are ranked in an order of the narrow band channel measurements, and may select one or more beams that have the highest narrowband channel measurements from the received beams based on the ranking. The beams with the highest narrowband channel measurements may be the beams whose narrowband channel measurements are greater than a threshold channel measurement value. In an aspect, when the UE receives different beams for different symbols, the UE determines the best beam (e.g., beam with the high narrowband channel measurement) received in each symbol. Thus, for example, if there are 14 symbols, the UE may determine the best beam for each symbol, and thus may determine 14 best beams, each best beam corresponding to a respective symbol of the 14 symbols. Subsequently, the UE may select one or more beams from the best beams, each best beam corresponding to a respective symbol, and transmit information about the selected one or more beams to the base station via a feedback signal to the base station. The UE may also select one or more frequency bands that provide the high narrowband channel measurements. Thus, in one aspect, the UE may send, to the base station, a feedback signal including information about N beams and the M frequency bands (e.g., M RBs) for each of N beams that provide the highest channel measurements. For example, referring back to the example of FIG. 5, M may range from 1 to 82, as there are 82 RBs carrying the BRSs, and N may range from 1 to 56 (14×4) if there are 14 symbols and 4 antenna ports. In an aspect, the feedback signal may further include channel estimation of the N beams.

Figure 7B:
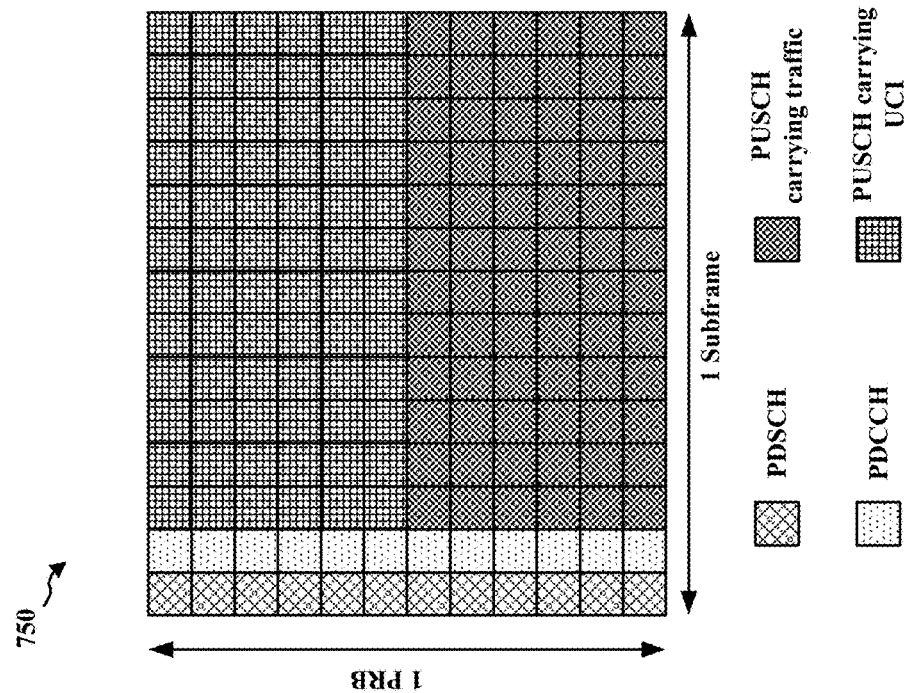
FIG. 7B is an example diagram illustrating a subframe structure when a feedback signal is sent via a physical uplink shared channel (PUSCH).
Figure 7A:
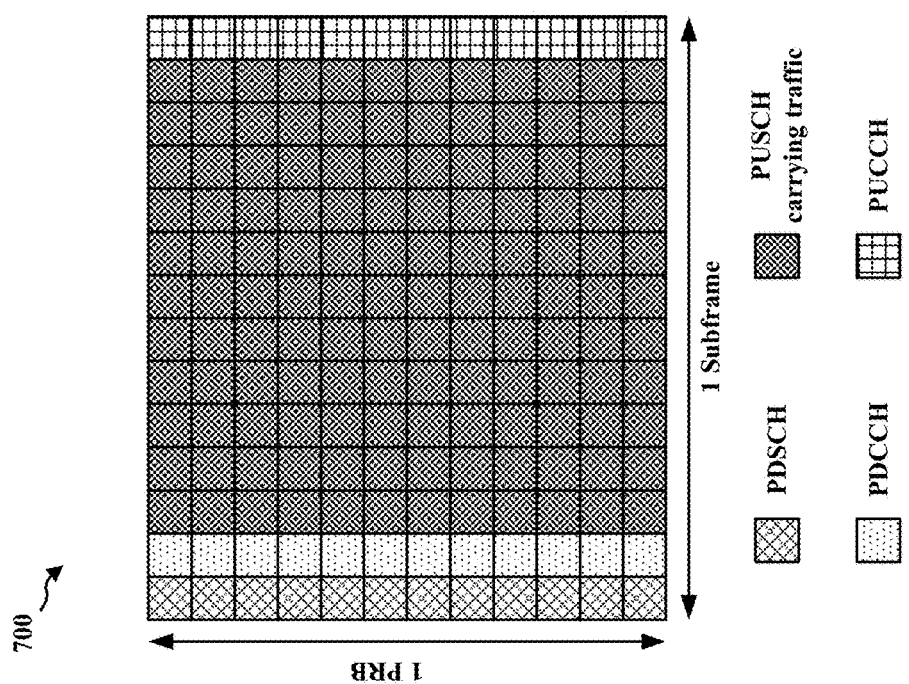
FIG. 7A is an example diagram illustrating a subframe structure when a feedback signal is sent via a physical uplink control channel (PUCCH).
Figure 12:
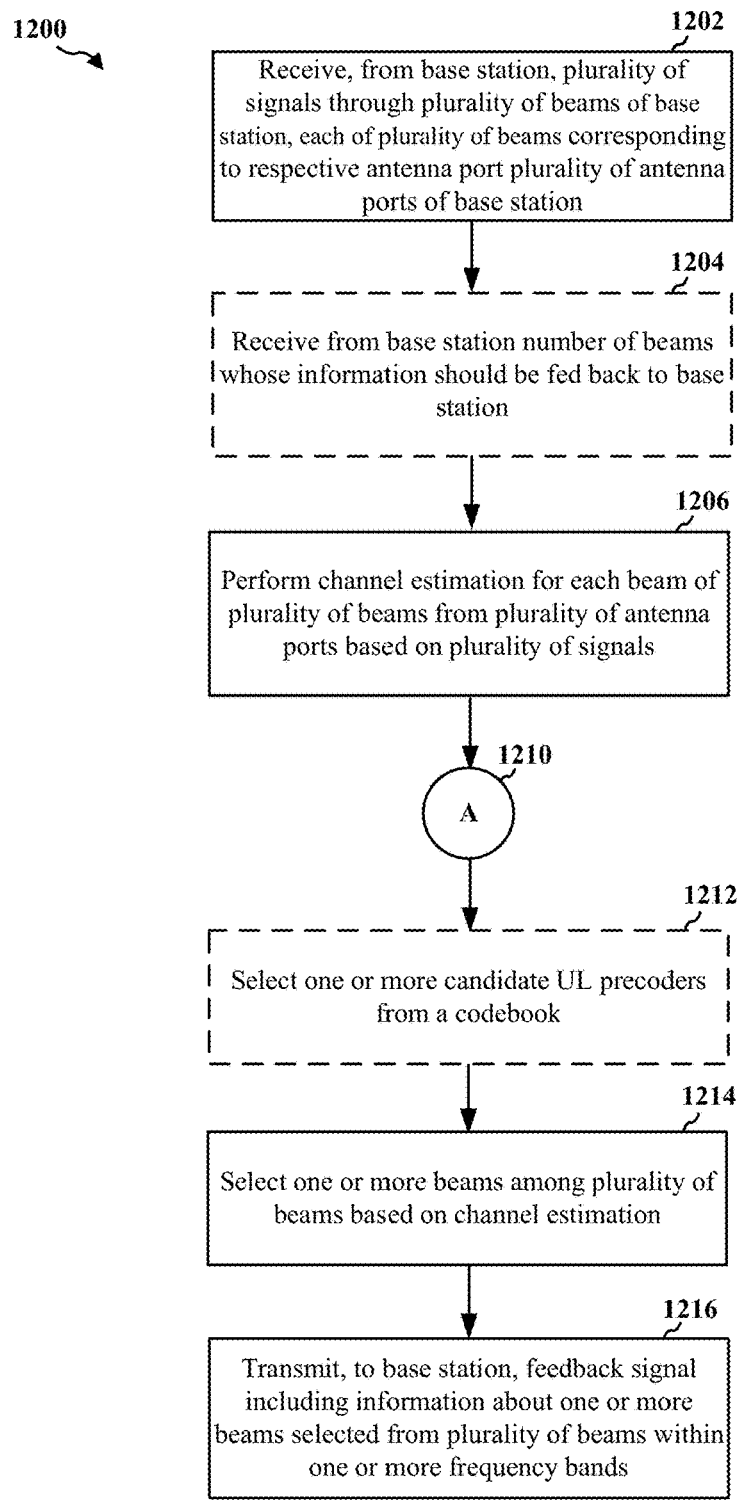
FIG. 12 is a flowchart of a method of wireless communication.

The base station may provide the UE with the number of beams whose information should be fed back via the feedback signal. For example, the base station may indicate to the UE that information about N best beams should be fed back to the base station. In an aspect, the base station may send the number of beams to the UE via RRC signaling or via information carried on a PDCCH. For example, the base station may inform the UE that information about N beams out of the received beams should be fed back to the base station. The UE may transmit the feedback signal to the base station via at least one of a PUCCH and/or in UCI conveyed via a PUSCH. The number of beams whose information should be fed back via the feedback signal may depend on whether the UE feeds back the information via a PUSCH or via a PUCCH. FIG. 7A is an example diagram 700 illustrating a subframe structure when a feedback signal is sent via a PUCCH. FIG. 7B is an example diagram 750 illustrating a subframe structure when a feedback signal is sent via a PUSCH. As illustrated in FIG. 7A, 12 RBs may be utilized to feedback the information via the PUCCH. As illustrated in FIG. 7B, 72 RBs may be utilized to feedback the information via the PUSCH carrying UCI. Because a different amount of resources are used depending on whether the UE uses the PUCCH or the PUSCH carrying UCI, a number of beams whose information should be fed back is different in FIG. 7A utilizing the PUCCH and FIG. 7B utilizing the PUSCH carrying UCI. In particular, the UE may send channel information for a higher number of beams using the subframe of FIG. 7B (via the PUSCH) than when using the subframe of FIG. 7A (via the PUCCH). For example, the number of beams whose information should be fed back may be 1 if the UE utilizes the PUCCH to transmit the feedback signal, and the number of beams whose information should be fed back may be 2 if the UE utilizes the PUSCH to transmit the feedback signal.

When the UE receives signals via different beams from different antenna ports of the base station (e.g., on a per symbol basis), the UE may also perform wideband channel estimation on each received beam of each symbol. To obtain the wideband channel estimation for a beam, the UE may obtain a wideband channel estimation measurement for the entire frequency region of a component carrier per symbol. For example, each component carrier in the example of FIG. 5 has 100 RBs. A number of wideband channel estimation measurements per symbol may be equal to the number of antenna ports. For example, if the synchronization subframe has 14 symbols as shown in FIG. 5 and if there are 4 antenna ports, the number of wideband channel measurements may be 4×14=56.

In an aspect, when the narrowband channel estimation is used with the wideband channel estimation, the wideband channel estimation may be used to select a beam. For example, a wideband channel estimation of each beam may include wideband channel estimation over frequency bands within each beam. For example, the UE may perform the wideband channel estimation for each beam if the wideband channel estimation for a first beam is high and the wideband channel estimation for second, third, and fourth beams are low, the UE may select the first beam to include information about the first beam in the feedback signal. Then, within the selected beam, the UE may perform narrowband channel estimation to determine the best frequency band(s) (e.g., RBs).

In another scenario, the UE may obtain narrowband band channel estimation of each RB of each beam to find the best beam. During the process of finding the best beam, UE first determines the number of RBs that will be used for DL scheduling and/or UL scheduling. The UE may determine the number of RBs used for DL scheduling based on path loss for DL scheduling. The UE may determine the number of RBs used for UL scheduling based on path loss, transmit power, and a buffer size for UL scheduling. After determining the number of RBs (e.g., M RBs), the UE may find the beam that provides the highest SNR in the best set of M RBs.

When the base station receives the feedback signal, the base station may select a beam out of the beams indicated in the feedback signal, and schedule DL communication with the UE based on the selected beam. For example, when the base station receives a feedback signal including information about N best beams, the base station may select a beam from the N best beams, such that the selected beam may be used for communication with the UE. The base station may select the beam out of the beams indicated in the feedback signal based on the narrowband channel measurement of each of the beams indicated in the feedback signal. In an aspect, the base station may select a beam with a high narrowband measurement. The base station may further consider other factors such as interference and noise when selecting the beam. In addition, if reciprocity holds between the DL and the UL (e.g., the same channel may be used for both DL and UL), the channel estimation based on the BRSs may be used for UL scheduling. In such a case, when the UE sends a feedback signal, the base station may select a beam out of the beams indicated in the feedback signal to schedule UL communication from the UE (e.g., frequency dependent UL scheduling). The beams indicated by the feedback signal may be the best M bands and N beams, as discussed above.

In one aspect, a beam refinement reference signal (BRRS) may be utilized to improve the channel estimation and the beam selection process. A base station may desire to cover as many directions as possible in a beam selection process. If the base station utilizes beams to cover an entire region (all possible angles), a total number of beams utilized by the base station may be so high that transmission of all the beams to cover all directions may be time consuming. Thus, the base station may utilize a limited number of beams sufficient for channel estimation. In particular, a total number of beams may be reduced for initial transmission by the base station. When the UE receives the reduced number of beams and corresponding BRSs, the UE may perform channel estimation based on the BRSs, and initially select a beam that provides the optimal performance for the UE (e.g., the best signal condition). When the UE informs the base station of the initially selected beam, the base station performs transmission using the initially selected beam and one or more other beams that are slightly different in angle from the initially selected beam. The UE may request the base station to transmit UE-specific BRRSs. When the base station performs transmission using the initially selected beam and the one or more other beams, the base station transmits BRRSs corresponding to the initially selected beam and the one or more other beams. For example, the base station transmits a corresponding BRRS via a respective beam of the initially selected beam and the one or more other beams. Subsequently, the UE performs channel estimation based on the BRRSs corresponding to the initially selected beam and the one or more other beams, and finally selects a beam that provides optimal performance (e.g., based on the beam with the highest signal-to-noise ratio, the beam with the highest antenna gain, or the beam with a highest reference signal measurement). The UE informs the base station of the finally selected beam, such that the base station may transmit using the finally selected beam.

Figure 8B:
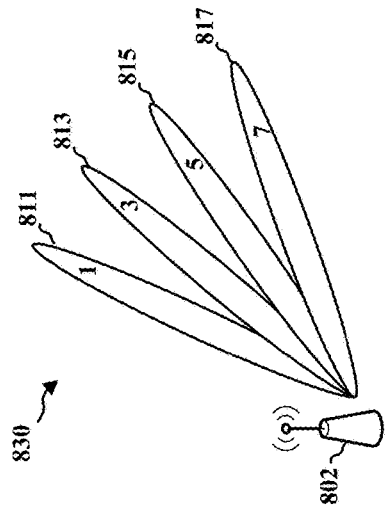
FIGS. 8A-8D are example diagrams illustrating a process of channel estimation based on beam reference signals (BRSs) and beam reference refinement signals (BRRSs), according to an aspect of the disclosure.
Figure 8D:
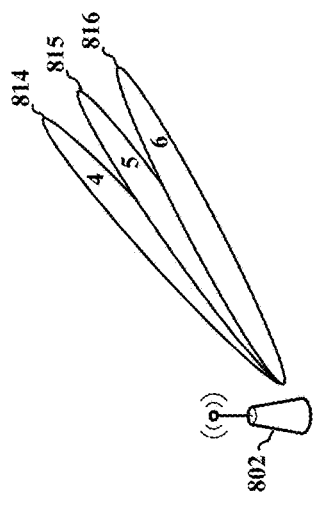
Figure 8A:
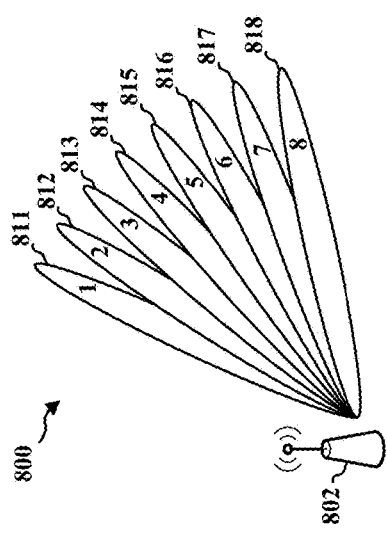
Figure 8C:
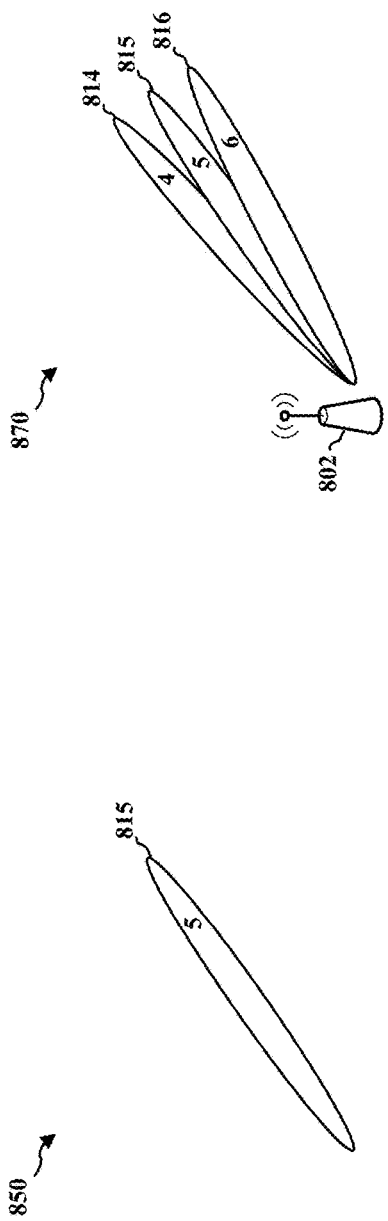

FIGS. 8A-8D are example diagrams 800, 830, 850, and 870 illustrating a process of channel estimation based on BRSs and BRRSs, according to an aspect of the disclosure. According to FIG. 8A, a base station 802 in this example has eight antenna ports, and thus may transmit eight beams 811, 812, 813, 814, 815, 816, 817, and 818 in eight different directions in a symbol. However, utilizing all eight beams may be unnecessarily time consuming for the base station. Thus, as illustrated in FIG. 8B, the base station 802 may initially utilize every other beam, thus performing transmission with four beams. In particular, the base station 802 initially utilizes the first beam 811, the third beam 813, the fifth beam 815 and the seventh beam 817, each beam including a corresponding BRS. The base station 802 may transmit signals using the beams in a synchronization subframe. When the UE receives the beams, the UE performs channel estimation for each beam based on the corresponding BRS, and initially selects a beam with the optimal channel estimation measurement. FIG. 8C illustrates that the UE initially selects the fifth beam 815 based on the channel estimation. The UE informs the base station of an identifier of the initially selected beam, which is the fifth beam 815. The UE may also request the base station to transmit BRRSs (e.g., UE-specific BRRSs). FIG. 8D illustrates that the base station 802 utilizes the initially selected beam (the fifth beam 815), and immediately adjacent beams (the fourth beam 814 and the sixth beam 816), to transmit corresponding BRRSs. The UE performs channel estimation of the fourth beam 814, the fifth beam 815, and the sixth beam 816 based on the corresponding BRRSs, and finally selects a beam with an optimal channel estimation measurement among the fourth beam 814, the fifth beam 815, and the sixth beam 816. The UE then informs the base station 802 of the finally selected beam.

Figure 9:
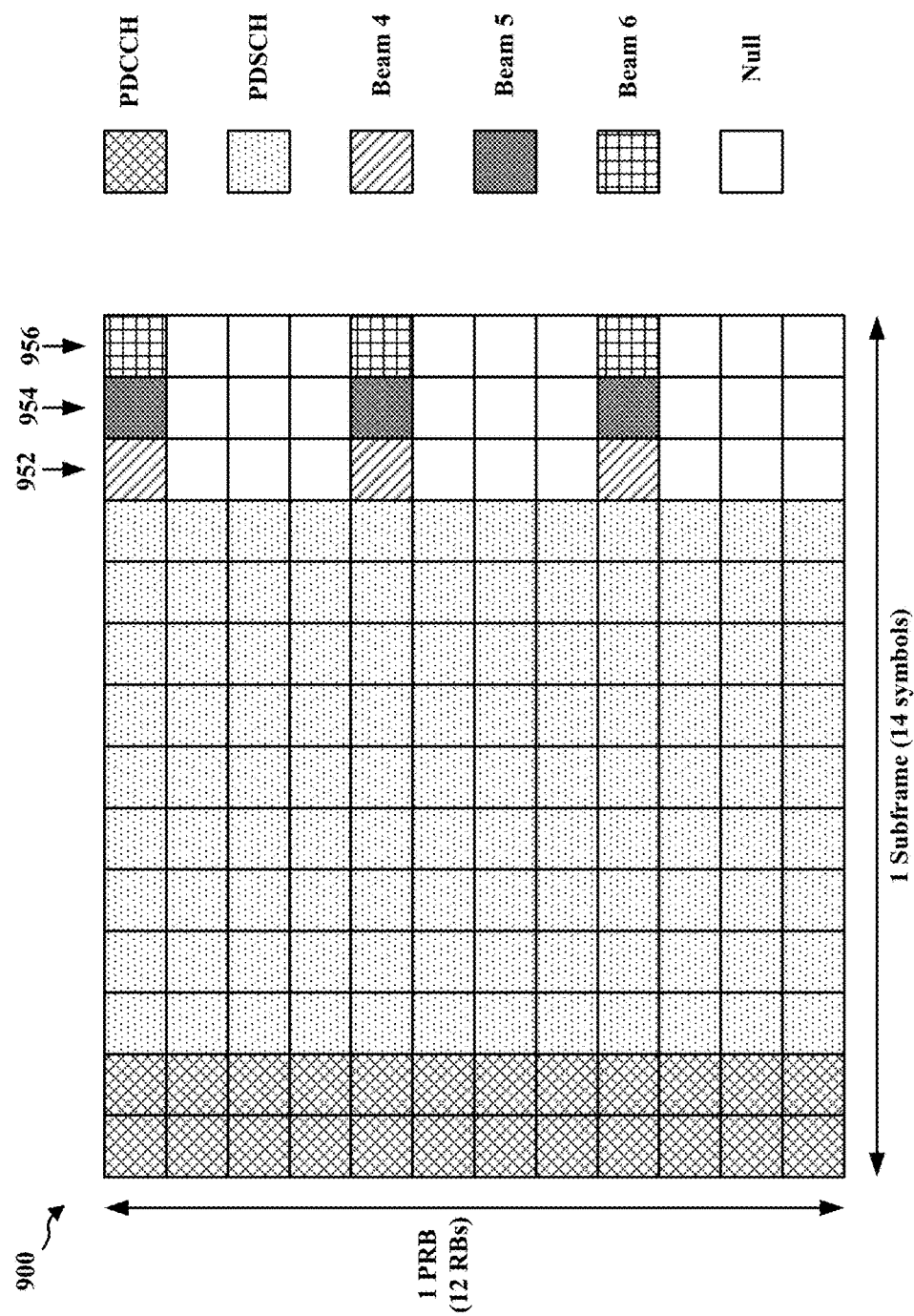
FIG. 9 is an example diagram illustrating a subframe structure for transmitting a BRRS.

FIG. 9 is an example diagram 900 illustrating a subframe structure for transmitting a BRRS. In one subframe, the first two symbols may be used to transmit a PDCCH, and the next nine symbols may be used to transmit PDSCH. BRRSs may be transmitted using the last three symbols in the subframe. In particular, for example, in the 12th symbol 952, the fourth beam 814 including a corresponding BRRS may be transmitted. In the 13th symbol 954, the fifth beam 815 including a corresponding BRRS may be transmitted. In the 14th symbol 956, the sixth beam 816 including a corresponding BRRS may be transmitted. For the 12th symbol 952, the 13th symbol 954, and the 14th symbol 956, the base station 802 occupies one RB of every four RBs for transmission of the beams. As a result, the BRRS signal transmitted in each of the 12th, 13th, and 14th symbols may be repeated three times within the symbol. This allows the UE to try three different receive combiners or subarrays for each beam within the symbol. Thus, after three symbols, the UE may determine the best transmit beam and receive beam pair.

Figure 10:
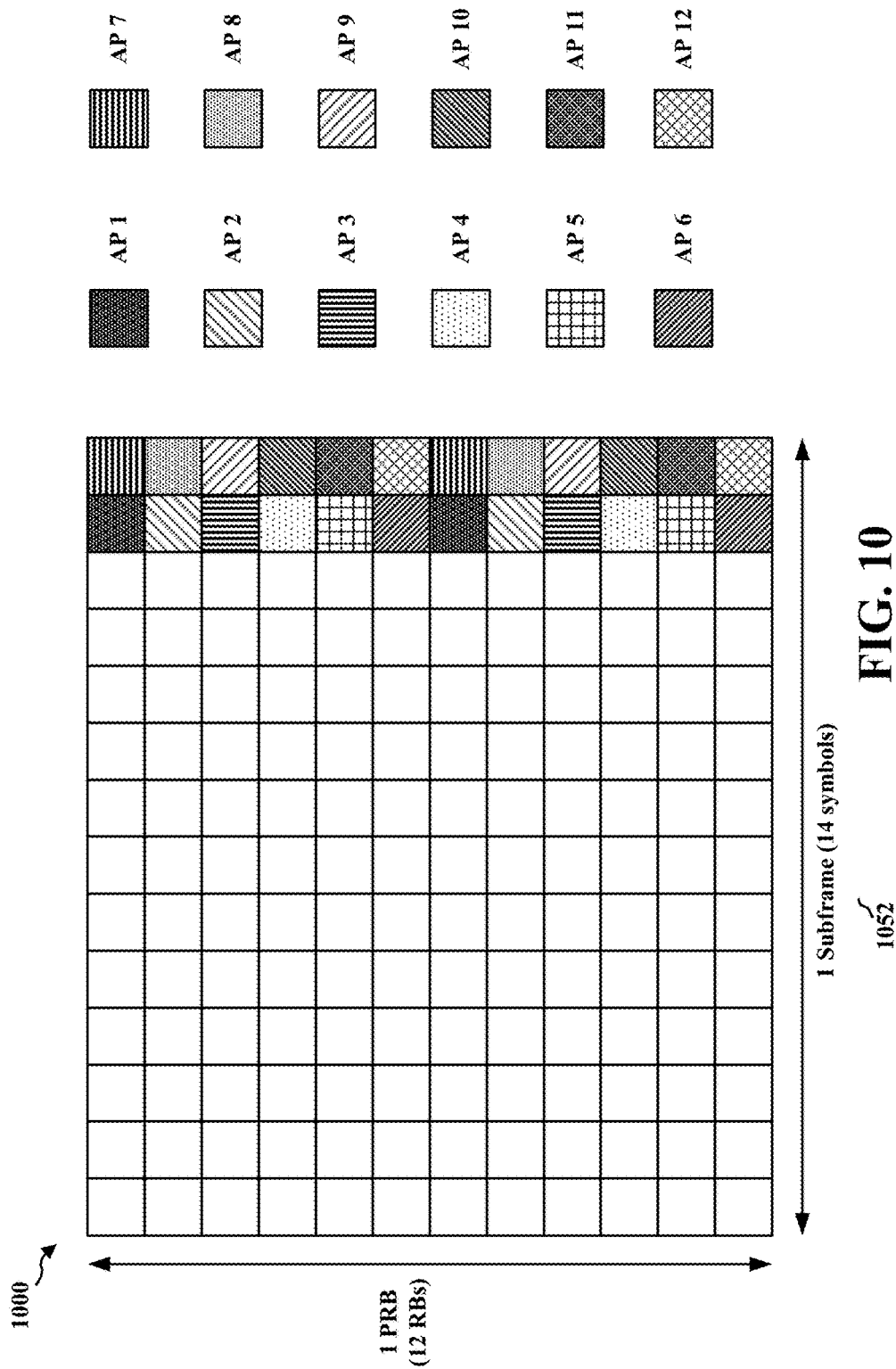
FIG. 10 is an example diagram illustrating a subframe structure for transmitting channel state information reference signals (CSI-RSs).

In an aspect, the UE may receive CSI-RSs from the base station, and perform channel estimation (e.g., narrowband channel estimation) for antenna ports of the base station based on the CSI-RSs. FIG. 10 is an example diagram 1000 illustrating a subframe structure for transmitting CSI-RSs. As illustrated in FIG. 10, within a subframe, the last two symbols may be dedicated to transmitting beams including CSI-RSs for different antenna ports of the base station. In the example diagram 1000 of FIG. 10, the base station has 12 different antenna ports. Thus, the UE may receive CSI-RSs through 12 different beams from the 12 antenna ports, and perform channel estimation on the beams corresponding to the 12 antenna ports based on the CSI-RSs.

In one aspect, the feedback signal may further include one or more candidate UL precoders. The UE may select the one or more candidate UL precoders from a predefined codebook. In one example, the UL precoders may correspond to various beams of the base station. As discussed above, the UE may perform channel estimation on various beams received from the base station. The UE may then select the one or more candidate UL precoders based on channel estimation of various beams corresponding to the precoders in the codebook. For example, the UE may select one or more candidate UL precoders that correspond to beams with high channel estimation measurements. The UE transmits the one or more candidate UL precoders to the base station, e.g., via the feedback signal. The base station may select a final UL precoder from the one or more candidate UL precoders, such that the base station may schedule a PUSCH for the UE based on the selected final UL precoder. The base station may select a final UL precoder from the one or more candidate UL precoders based on the channel estimation of beams corresponding to the one or more candidate UL precoders.

Figure 11:
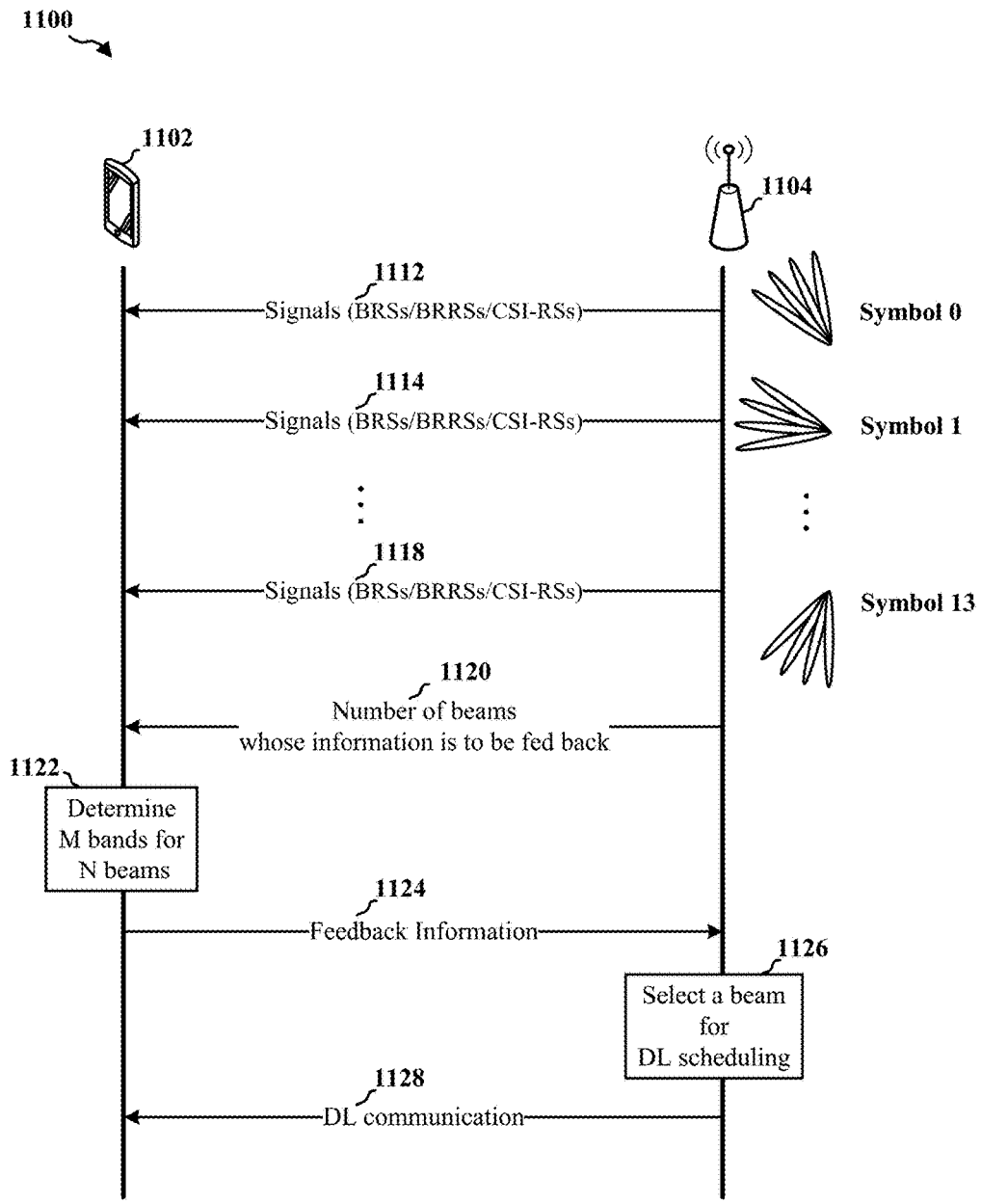
FIG. 11 is an example diagram illustrating communication between a user equipment and a base station in millimeter wave communication, according to an aspect of the disclosure.

FIG. 11 is an example diagram 1100 illustrating communication between a user equipment and a base station in millimeter wave communication, according to an aspect of the disclosure. The example diagram 1100 involves communication between a UE 1102 and a base station 1104. In the example diagram 1100, the base station has four antenna ports, and transmits four beams per symbol. At 1112, the base station 1104 transmits four beams including corresponding signals (BRSs or BRRSs or CSI-RSs) in a first angular range corresponding to the first symbol (symbol 0). At 1114, the base station 1104 transmits four beams including corresponding signals (BRSs or BRRSs or CSI-RSs) in a second angular range corresponding to the second symbol (symbol 1). The base station 1104 continues to transmit beams including corresponding signals (BRSs or BRRSs or CSI-RSs) in different angular ranges for different symbols. At 1118, the base station 1104 transmits four beams including corresponding signals (BRSs or BRRSs or CSI-RSs) in a fourteenth angular range corresponding to the fourteenth symbol (symbol 13). Thus, in this example, the base station 1104 transmits 4 beams in different directions per symbol, and thus transmits 56 beams in various directions over 14 symbols. At 1120, the base station 1104 may send a number of beams whose information should be fed back to the base station, where the number of beams may be N. In an aspect, at 1120, the base station 1104 sends the number of beams to the UE 1102 via RRC signaling or via information conveyed via a PDCCH. In an aspect, bits in DCI transmitted to the UE 1102 may be reserved to carry information about the number of beams N.

At 1122, the UE may perform wideband channel estimation and/or narrowband channel estimation for each received beam carrying a corresponding signal (e.g., BRS or BRRSs or CSI-RS), and determines desirable frequency bands and beams based on the wideband channel estimation of each received beam and/or narrowband channel estimation of each received beam. For example, the UE may perform wideband channel estimation of each beam to determine an SNR for the entire frequency region for each beam in each symbol, and then may perform narrowband channel estimation to determine SNR values for each RB used to carry the corresponding signal (BRS or BRRSs or CSI-RS) in each symbol. In one example, the UE may select one or more beams based on the wideband channel estimation, and then may select one or more RBs based on the narrowband channel estimation. For example, the UE may determine M frequency bands (e.g., M RBs) for each of N beams that correspond to the best narrowband channel measurements. As discussed above, N may be less than or equal to a number of symbols times a number of antenna ports, and M may be less than or equal to the number of RBs carrying the signals (BRSs or BRRSs or CSI-RSs) in one symbol, where a size of each frequency band may correspond to a size of each RB in frequency. At 1124, the UE sends feedback information to the base station 1104, where the feedback information may include information on the M frequency bands for each of N beams that correspond to the best narrowband channel measurements. In an aspect, the feedback information may be transmitted to the base station 1104 via at least one of a PUCCH and/or in UCI conveyed via a PUSCH. In an aspect, the feedback information may be transmitted to the base station 1104 through a RACH subframe. At 1126, the base station 1104 may select a beam among the N beams. Further, for the selected beam, the base station 1104 may also select a frequency band among M frequency bands, to schedule downlink (DL) communication with the UE 1102. At 1128, the base station 1104 performs DL communication with the UE 1102 via the beam selected among the N beams.

FIG. 12 is a flowchart 1200 of a method of wireless communication. The method may be performed by a UE (e.g., the UE 1102, the apparatus 1402/1402'). At 1202, the UE receives, from a base station, a plurality of signals through a plurality of beams of the base station, each of the plurality of beams corresponding to a respective antenna port of a plurality of antenna ports of the base station. In an aspect, the plurality of signals may include a plurality of beam reference signals, a plurality of beam refinement reference signals, a plurality of CSI-RSs, or a combination thereof. For example, as discussed supra, an antenna port including a set of antennas (e.g., 64 antennas) may transmit one beam, and multiple antenna ports may transmit multiple beams respectively, each in a different direction. For example, as illustrated in FIG. 4A, a base station 402 in the example diagram 400 has four antenna ports, and may transmit four beams 412, 414, 416, and 418 in four different directions in the first symbol. For example, as discussed supra, the base station may transmit BRSs in various directions via corresponding beams so that the UE may identify the best beam of the one or more beams received from the base station based on measurements on the BRSs. For example, as discussed supra, when the base station performs transmission using the initially selected beam and one or more other beams, the base station transmits BRRSs corresponding to the initially selected beam and the one or more other beams. In an aspect, the plurality of beam reference signals may be received during a synchronization subframe. For example, as illustrated in FIG. 5, the synchronization subframe may be used to carry BRSs.

At 1204, the UE may receive from the base station a number of beams whose information should be fed back to the base station. For example, as discussed supra, the base station may inform the UE that information about N beams should be fed back to the base station. In an aspect, the number of beams may be based on whether the UE transmits a feedback signal via a PUSCH or a PUCCH. In such an aspect, the number of beams whose information should be fed back is higher for feedback via the PUSCH than for feedback via the PUCCH. For example, as illustrated in FIGS. 7A and 7B, because a different amount of resources are used depending on whether the UE uses the PUCCH or the PUSCH carrying UCI, a number of beams whose information should be fed back is different in FIG. 7A that utilizes the PUCCH and FIG. 7B that utilizes the PUSCH carrying UCI. For example, as illustrated in FIGS. 7A and 7B, the UE sends channel information of a higher number of beams using the subframe of FIG. 7B (via the PUSCH) than using the subframe of FIG. 7A (via the PUCCH). In an aspect, the number of beams may be two. In such an aspect, a strongest beam of the two beams may be used as an active beam for the UE and a weakest beam of the two beams is used as a candidate beam for the UE. For example, as discussed supra, the number of beams whose information should be fed back may be 2 if the UE utilizes the PUSCH to transmit the feedback signal. For example, as discussed supra, the base station may select a beam out of the beams indicated in the feedback signal, such that the UE may utilize the selected beam as an active beam.

At 1206, the UE performs channel estimation for each beam of the plurality of beams from the plurality of antenna ports based on the plurality of signals. For example, as discussed supra, when the UE receives different beams from different antenna ports of the base station per symbol, the UE may perform narrowband channel estimation on received beams based on the BRSs corresponding to the received beams. In an aspect, the channel estimation may include at least one of narrowband channel estimation or wideband channel estimation. For example, as discussed supra, the UE may also use the BRS to perform wideband channel estimation for each beam and/or to perform narrowband channel estimation for each beam. In an aspect, the channel estimation is based on a measurement of at least one of a signal-to-noise ratio, an antenna gain, or a reference signal measurement of each of the plurality of beams. For example, as discussed supra, the measurement of the channel estimation may be based on at least one of one of a signal-to-noise ratio, an antenna gain, or a reference signal measurement (e.g., reference signal receive power and/or reference signal received quality) of the received beams, based on the BRSs. In an aspect, the plurality of beams from the plurality of antenna ports are received at different directions.

At 1210, the UE may perform additional features as discussed supra. At 1212, in an aspect, the UE may select one or more candidate uplink precoders from a predefined codebook. For example, as discussed supra, the UE may select the one or more candidate UL precoders based on channel estimation of various beams that corresponds to the precoders in the codebook.

At 1214, the UE selects one or more beams from the plurality of beams based on the channel estimation. In an aspect, the UE may select the one or more beams among the plurality of beams by selecting a beam with a high measurement of the channel estimation for each of a plurality of symbols, the high measurement being greater than a threshold measurement for the channel estimation, each symbol being associated with a corresponding set of beams from the plurality of antenna ports, where the one or more beams are selected among the beams with the high measurements for the plurality of symbols. For example, as discussed supra, the UE selects one or more beams that have the high narrowband channel measurements based on the ranking, where the beams with the high narrowband channel measurements may be the beams whose narrowband channel measurements are greater than a threshold channel measurement value. For example, as discussed supra, when the UE receives different beams for different symbols, the UE determines the best beam (e.g., beam with the high narrowband channel measurement) received in each symbol, and subsequently may select one or more beams from the best beams, each best beam corresponding to a respective symbol. In an aspect, the one or more beams are selected within one or more frequency bands based on the channel estimation. For example, as discussed supra, the UE may also select one or more frequency bands that provide the high narrowband channel measurement.

At 1216, the UE transmits, to the base station, a feedback signal including information about one or more beams selected from the plurality of beams within one or more frequency bands. For example, as discussed supra, the UE may select one or more beams out of the best beams, and transmit information about the selected one or more beams to the base station via a feedback signal to the base station, and may also select one or more frequency bands that provide the high narrowband channel measurement. For example, as discussed supra, the UE may send, to the base station, a feedback signal including information about the best M bands (e.g., M RBs) and N beams. In an aspect, a number of the one or more beams may be based on the number of beams whose information should be fed back to the base station (e.g., where the number of beams whose information should be fed back to the base station is received from the base station at 1204). For example, as discussed supra, the base station may send the UE the number of beams whose information should be fed back to the base station. In an aspect, the feedback signal is transmitted to the base station via at least one of a PUCCH or in UCI conveyed via a PUSCH. For example, as illustrated in FIGS. 7A and 7B, the UE may transmit the feedback signal via at least one of a PUCCH or in UCI conveyed via a PUSCH. In an aspect, the feedback signal is transmitted to the base station through a RACH subframe.

In an aspect, the feedback signal may further include the one or more candidate uplink precoders selected by the UE. In such an aspect, the one or more candidate uplink precoders may each be a candidate for a precoder used for scheduling a PUSCH. For example, as discussed supra, the feedback signal may further include one or more candidate UL precoders. For example, as discussed supra, the base station may select a final UL precoder from the one or more candidate UL precoders, such that the base station may schedule a PUSCH for the UE based on the final UL precoder.

Figure 13:
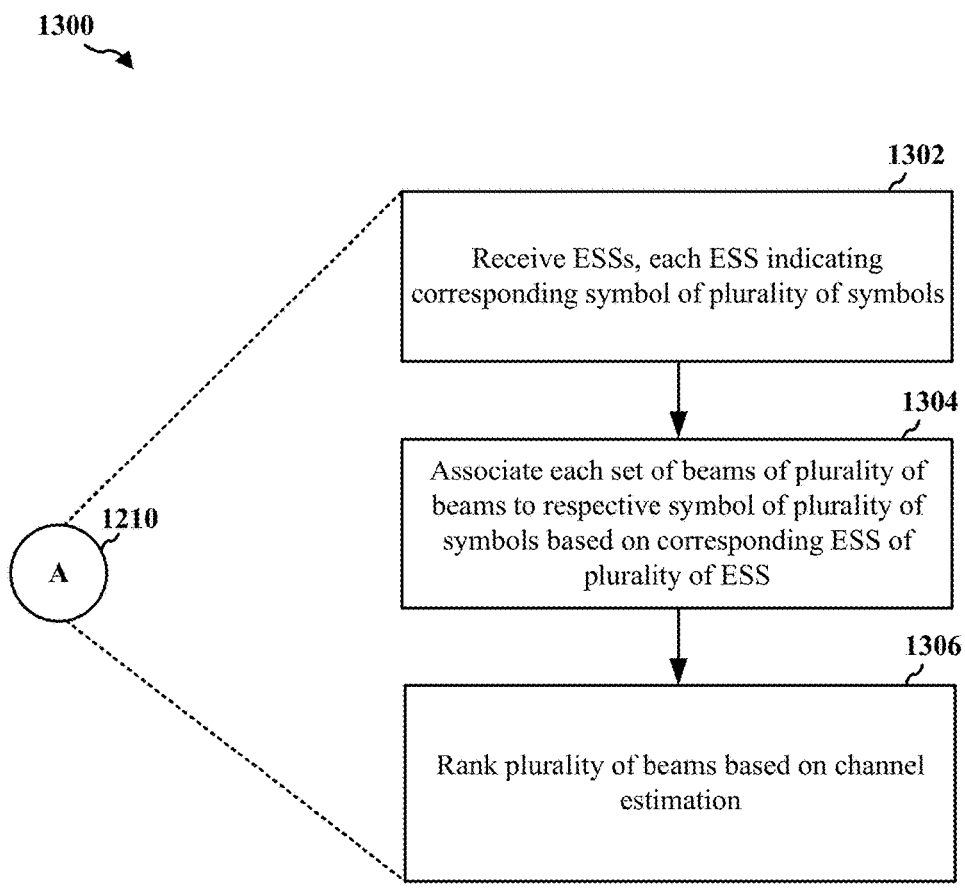
FIG. 13 is a flowchart of a method of wireless communication, expanding from the flowchart of FIG. 12, according to an aspect.

FIG. 13 is a flowchart 1300 of a method of wireless communication, expanding from the flowchart 1200 of FIG. 12, according to an aspect. The method may be performed by a UE (e.g., the UE 1102, the apparatus 1402/1402'). The features of the flowchart 1300 may continue from 1208 of FIG. 12. At 1208, the UE receives a plurality of ESSs, each ESS indicating a corresponding symbol of a plurality of symbols. At 1210, the UE associates each set of beams to a respective symbol based on a corresponding ESS. For example, as discussed supra, the UE may receive an ESS, where the ESS may be used to indicate a symbol, in order to enable the UE to identify a particular symbol index within the subframe. For example, as discussed supra, for each received beam at the UE, the UE may identify the received beam based on a BRS received from the base station via the received beam, and may identify a symbol for the received beam based on an ESS received via the received beam.

At 1306, the UE ranks each beam of the plurality of beams based on the channel estimation, where the UE may select the one or more beams from the plurality of beams based on the ranking (e.g., at 1214). For example, as discussed supra, the UE may rank the beams based on the narrowband channel estimation of each beam, and select one or more beams that have the high narrowband channel measurements based on the ranking. In an aspect, the measuring of the channel estimation for the plurality of beams at 1206 may include performing wideband channel estimation for each beam of the plurality of beams, where the ranking is further based on the wideband channel estimation for the plurality of beams. For example, as discussed supra, if the wideband channel estimation for a first beam is high and the wideband channel estimation for second, third, and fourth beams are low, the UE may select the first beam to include information about the first beam in the feedback signal.

Figure 14:
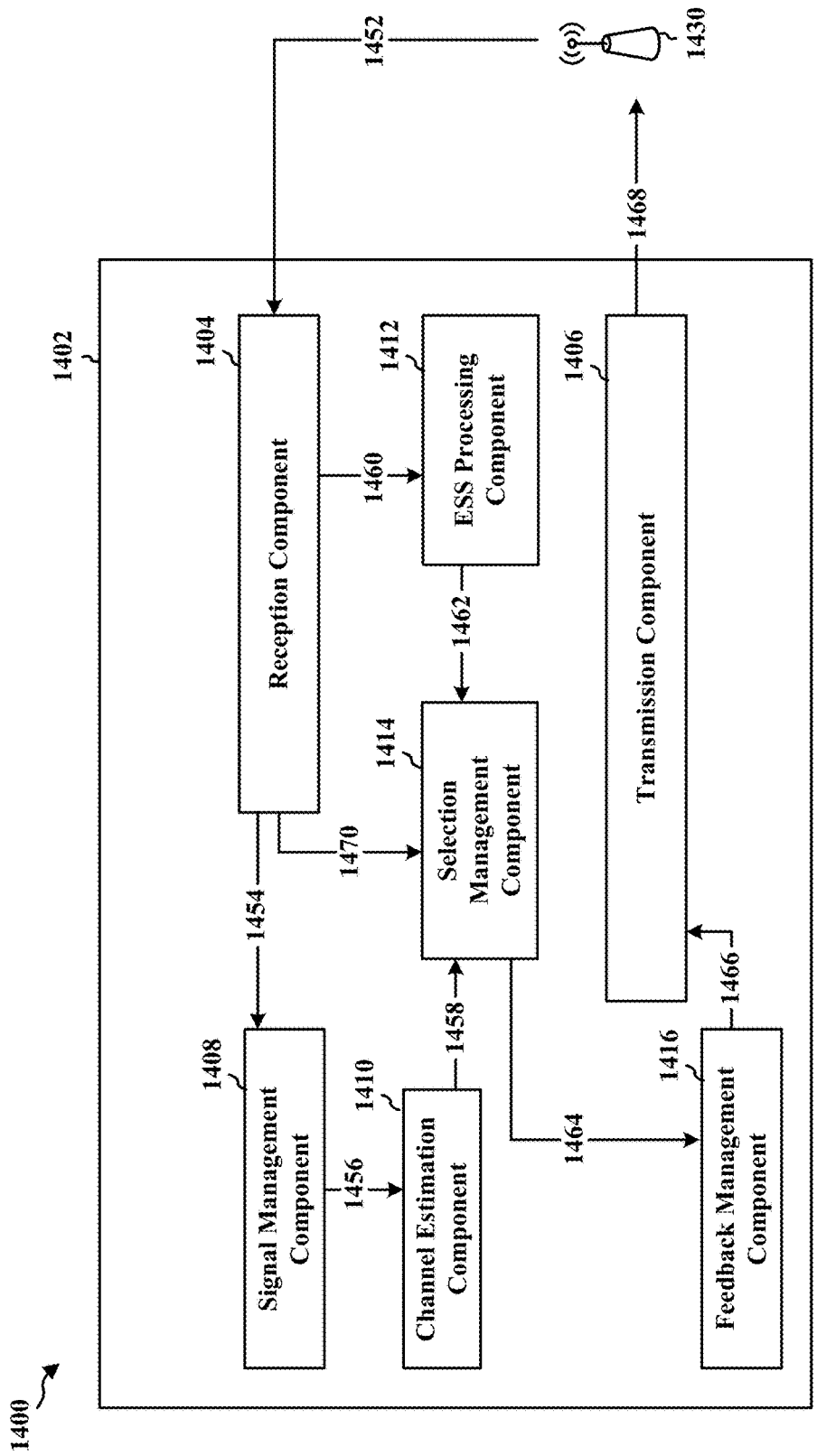
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE. The apparatus includes a reception component 1404, a transmission component 1406, a signal management component 1408, a channel estimation component 1410, an ESS processing component 1412, a selection management component 1414, and a feedback management component 1416.

The signal management component 1408 receives, from a base station (e.g., base station 1430), via the reception component 1404 at 1452 and 1454, a plurality of signals through a plurality of beams of the base station, each of the plurality of beams corresponding to a respective antenna port of a plurality of antenna ports of the base station. In an aspect, the plurality of signals may include a plurality of beam reference signals, a plurality of beam refinement reference signals, a plurality of CSI-RSs, or a combination thereof. In an aspect, the plurality of signals may be received during a synchronization subframe. In an aspect, the selection management component 1414 may receive, via the reception component 1404, at 1452 and 1470, from the base station a number of beams whose information should be fed back to the base station. In an aspect, the number of beams may be based on whether the UE transmits a feedback signal via physical uplink shared channel or physical uplink control channels. In such an aspect, the number of beams whose information should be fed back is higher for feedback via the PUSCH than for feedback via the PUCCH. In an aspect, the number of beams may be two. In such an aspect, a strongest beam of the two beams may be used as an active beam for the UE and a weakest beam of the two beams is used as a candidate beam for the UE. The signal management component may communicate information about beams and corresponding signals (e.g., BRSs and/or BRRSs) to the channel estimation component 1410 at 1456.

The channel estimation component 1410 performs channel estimation for each beam of the plurality of beams from the plurality of antenna ports based on the plurality of signals. In an aspect, the channel estimation may include at least one of narrowband channel estimation or wideband channel estimation. In an aspect, the channel estimation is based on a measurement of at least one of a signal-to-noise ratio, an antenna gain, or a reference signal measurement of each of the plurality of beams. In an aspect, the plurality of beams from the plurality of antenna ports are directed at different directions. The channel estimation component 1410 may provide results of the measurements of the channel estimation to the selection management component 1414 at 1458.

The ESS processing component 1412 receives, via the reception component 1404 at 1452 and 1460, a plurality of ESSs, each ESS indicating a corresponding symbol of the plurality of symbols. The ESS processing component 1412 associates each set of beams of the plurality of beams to a respective symbol of the plurality of symbols based on a corresponding ESS of the plurality of ESSs. The ESS processing component 1412 may provide the association information of each set of beams to a respective symbol to the selection management component 1414, at 1462.

The selection management component 1414 selects one or more beams from the plurality of beams based on the channel estimation. The selection management component 1414 ranks the plurality of beams based on the channel estimation. In an aspect, the ranking may be further based on wideband channel estimation for the plurality of beams. In such an aspect, the selection management component 1414 may select the one or more beams from the plurality of beams based on the ranking. In an aspect, the channel estimation component 1410 may perform wideband channel estimation for each beam of the plurality of beams, where the ranking by the selection management component 1414 is further based on wideband channel estimation for the plurality of beams. In an aspect, the UE may select the one or more beams among the plurality of beams by selecting a beam with a high measurement of the narrowband channel estimation for each of a plurality of symbols, the high measurement being greater than a threshold measurement for the narrowband channel estimation, each symbol being associated with a corresponding set of beams from the plurality of antenna ports, where the one or more beams are selected among the beams with the high measurements for the plurality of symbols. In an aspect, the one or more beams are selected within one or more frequency bands based on the measured narrowband channel estimation. The selection management component 1414 may provide information about the one or more beams selected from the plurality of beams to the feedback management component 1416 at 1464.

The feedback management component 1416 transmits, to the base station, via the transmission component 1406 at 1466 and 1468, a feedback signal including information about the one or more beams selected from the plurality of beams within one or more frequency bands. In an aspect, a number of the one or more beams may be based on the number of beams whose information should be fed back to the base station. In an aspect, the feedback signal may be transmitted to the base station via at least one of a PUCCH or in UCI conveyed via a PUSCH. In an aspect, the feedback signal may be transmitted to the base station through a RACH subframe. In an aspect, the selection management component 1414 may select one or more candidate uplink precoders from a predefined codebook, where the feedback signal further includes the one or more candidate uplink precoders. In such an aspect, the one or more candidate uplink precoders may be selected based on the channel estimation. In such an aspect, the one or more candidate uplink precoders may each be a candidate for a precoder used for scheduling a PUSCH.

The apparatus may include additional components that perform each of the blocks of the algorithm in the aforementioned flowcharts of FIGS. 12 and 13. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
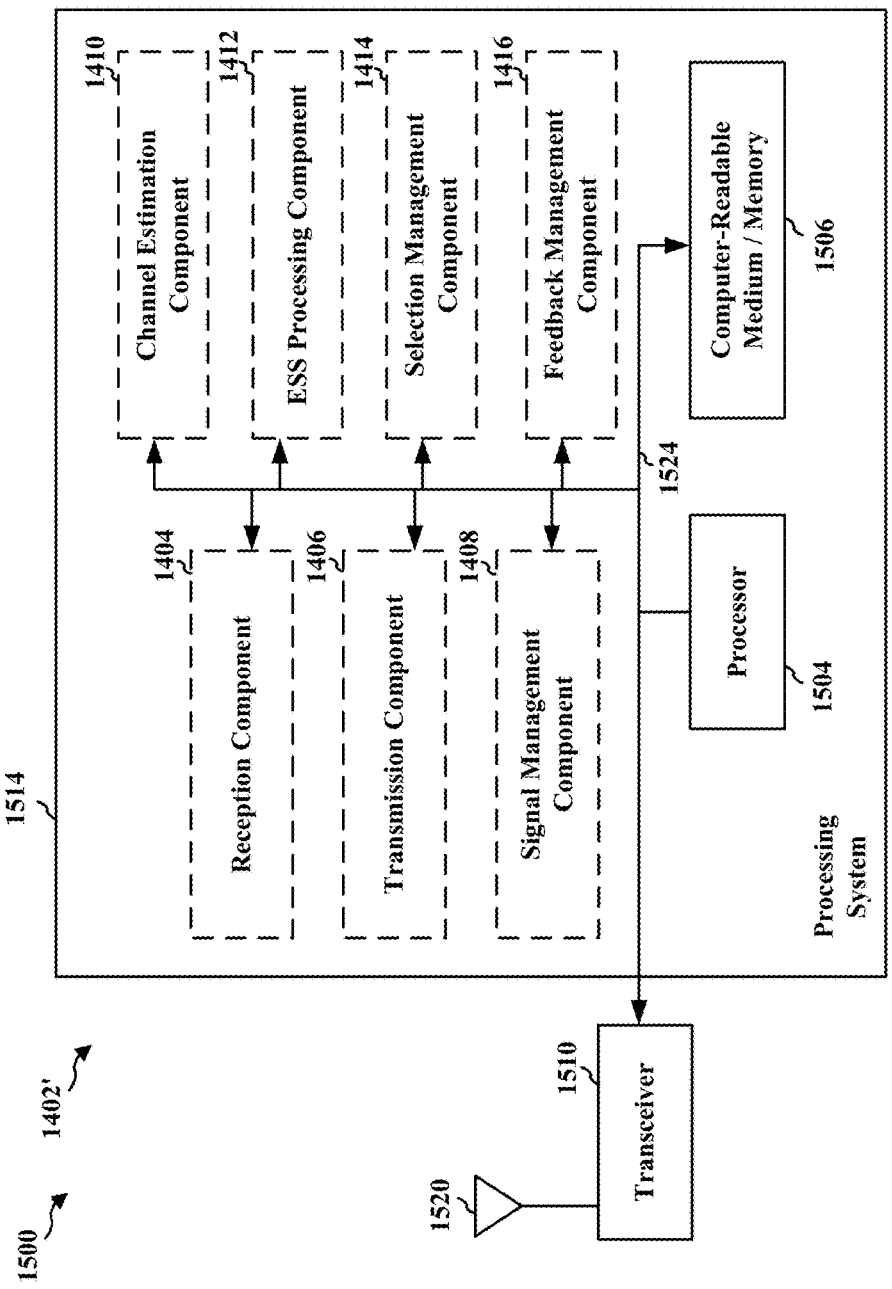
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for receiving, from a base station, a plurality of signals through a plurality of beams of the base station, each of the plurality of beams corresponding to a respective antenna port of a plurality of antenna ports of the base station, and means for performing channel estimation for each beam of the plurality of beams from the plurality of antenna ports based on the plurality of signals. In an aspect, the apparatus 1402/1402' includes means for selecting one or more beams from the plurality of beams based on the channel estimation, and means for transmitting, to the base station, a feedback signal including information about the one or more beams selected from the plurality of beams within one or more frequency bands. In an aspect, the apparatus 1402/1402' includes means for ranking the plurality of beams based on the channel estimation, where the means for selecting the one or more beams from the plurality of beams is based on the ranking. In an aspect, the means for measuring the channel estimation for the plurality of beams may be configured to perform wideband channel estimation for each beam of the plurality of beams, where the means for ranking is configured to rank the plurality of beams further based on the wideband channel estimation for the plurality of beams. In an aspect, the means for selecting the one or more beams among the plurality of beams is configured to: select a beam with a high measurement of the channel estimation for each of a plurality of symbols, the high measurement being greater than a threshold measurement for the channel estimation, each symbol being associated with a corresponding set of beams from the plurality of antenna ports, wherein the one or more beams are selected among the beams with the high measurements for the plurality of symbols.

In an aspect, the apparatus 1402/1402' includes means for receiving a plurality of ESSs, each ESS indicating a corresponding symbol of the plurality of symbols, and means for associating each set of beams of the plurality of beams to a respective symbol of the plurality of symbols based on a corresponding ESS of the plurality of ESSs. In an aspect, the apparatus 1402/1402' includes means for selecting one or more candidate uplink precoders from a predefined codebook, where the feedback signal further includes the one or more candidate uplink precoders. In an aspect, the apparatus 1402/1402' includes means for receiving from the base station a number of beams whose information should be fed back to the base station.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
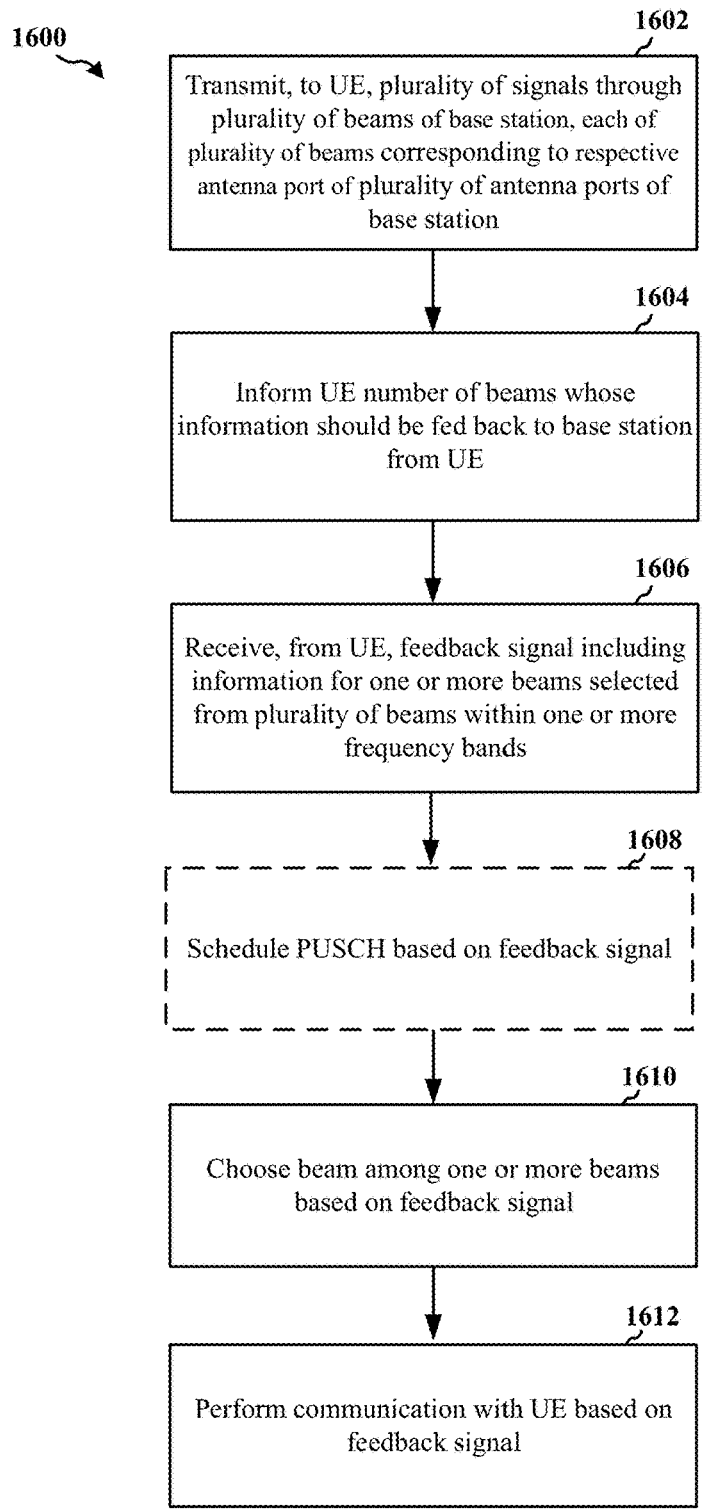
FIG. 16 is a flowchart of a method of wireless communication.

FIG. 16 is a flowchart 1600 of a method of wireless communication. The method may be performed by a base station (e.g., the base station 1104, the apparatus 1302/1302'). At 1602, the base station may transmit a plurality of signals through a plurality of beams of the base station, each of the plurality of beams corresponding to a respective antenna port of a plurality of antenna ports of the base station. In an aspect, the plurality of signals include a plurality of beam reference signals, a plurality of beam refinement reference signals, a plurality of CSI-RSs, or a combination thereof. For example, as discussed supra, an antenna port including a set of antennas (e.g., 64 antennas) may transmit one beam, and multiple antenna ports may transmit multiple beams respectively, each in a different direction. For example, as illustrated in FIG. 4A, a base station 402 in the example diagram 400 has four antenna ports, and may transmit four beams 412, 414, 416, and 418 in four different directions in the first symbol. For example, as discussed supra, the base station may transmit BRSs in various directions via corresponding beams so that the UE may identify the best beam of the one or more beams received from the base station based on measurements on the BRSs. For example, as discussed supra, when the base station performs transmission using the initially selected beam and one or more other beams, the base station transmits BRRSs corresponding to the initially selected beam and the one or more other beams. In an aspect, the plurality of beam reference signals are transmitted during a synchronization subframe. For example, as illustrated in FIG. 5, the synchronization subframe may be used to carry BRSs.

In an aspect, one or more beams may be selected based on channel estimation for each beam of the plurality of beams and the channel estimation includes at least one of narrowband channel estimation wideband channel estimation. For example, as discussed supra, the UE may also use the BRS to perform wideband channel estimation for each beam and/or to perform narrowband channel estimation for each beam. In an aspect, the base station transmits the plurality of signals by sweeping through a plurality of directions in different symbols to transmit the plurality of signals. For example, as discussed supra, the base station may use multiple antenna ports in a cell specific manner in a first symbol of a synchronization sub-frame to sweep in multiple directions, and then may sweep in multiple directions using the multiple antenna ports in a cell specific manner in another symbol of the synchronization subframe. For example, as illustrated in FIG. 11, the base station may transmit beams at four different directions per symbol, over 14 symbols.

At 1604, the base station informs a UE of a number of beams whose information should be fed back to the base station from the UE. For example, as discussed supra, the base station may inform the UE that information about N beams should be fed back to the base station. In an aspect, the base station may inform the UE via RRC signaling or via information conveyed over a PDCCH. For example, as discussed supra, the base station sends the number of beams to the UE through RRC signaling or a PDCCH. In an aspect, one or more bits are reserved in DCI transmitted to the UE to inform the UE of the number of beams whose information should be fed back to the base station. For example, as illustrated in FIG. 11, bits in DCI transmitted to the UE 1102 may be reserved to carry information about the number of beams. In an aspect, the number of beams is determined based on whether the feedback signal is received via a PUSCH or via a PUCCH. For example, as illustrated in FIGS. 7A and 7B, because a different amount of resources are used depending on whether the UE uses the PUCCH or the PUSCH carrying UCI, a number of beams whose information should be fed back is different in FIG. 7A that utilizes the PUCCH and FIG. 7B that utilizes the PUSCH carrying UCI. For example, as illustrated in FIGS. 7A and 7B, the UE sends channel information of a higher number of beams using the subframe of FIG. 7B (via the PUSCH) than using the subframe of FIG. 7A (via the PUCCH). In such an aspect, the number of beams whose information should be fed back is higher for feedback via the PUSCH than for feedback via the PUCCH. In an aspect, the number of beams is two. In such an aspect, a strongest beam of the two beams is used as an active beam for the UE and a weakest beam of the two beams is used as a candidate beam for the UE. For example, as discussed supra, the number of beams whose information should be fed back may be 2 if the UE utilizes the PUSCH to transmit the feedback signal. For example, as discussed supra, the base station may select a beam out of the beams indicated in the feedback signal, such that the UE may utilize the selected beam as an active beam.

At 1606, the base station receives, from the UE, a feedback signal including information about one or more beams selected from the plurality of beams within one or more frequency bands. For example, as discussed supra, the UE may select one or more beams out of the best beams, and transmit information about the selected one or more beams to the base station via a feedback signal to the base station, and may also select one or more frequency bands that provide the high narrowband channel measurement. For example, as discussed supra, the base station may receive, from the UE, a feedback signal including information about the best M bands (e.g., M RBs) and N beams. In an aspect, the feedback signal is received from the UE via at least one of a PUCCH or UCI in a PUSCH. For example, as illustrated in FIGS. 7A and 7B, the base station may receive, from the UE, the feedback signal via at least one of a PUCCH or UCI in a PUSCH. In an aspect, the feedback signal is received from the UE through a RACH subframe. In an aspect, a number of the one or more beams may be based on the number of beams whose information should be fed back to the base station. For example, as discussed supra, the base station may send the UE the number of beams whose information should be fed back to the base station.

At 1608, in an aspect, the base station may schedule resources for the UE on a PUSCH based on the feedback signal. In such an aspect, the feedback signal may further include one or more candidate uplink precoders, and the scheduling the PUSCH may further include: selecting a final uplink precoder from the one or more candidate uplink precoders, and scheduling the PUSCH based on the final uplink precoder. For example, as discussed supra, the base station may select a final UL precoder from the one or more candidate UL precoders included in the feedback signal, such that the base station may schedule a PUSCH for the UE based on the final UL precoder. In such an aspect, the one or more candidate uplink precoders are from a predefined codebook. For example, as discussed supra, the feedback signal may further include one or more candidate UL precoders.

At 1610, the base station may choose a beam among the one or more beams based on the feedback signal. At 1612, the base station performs communication with the UE based on the feedback signal. In an aspect, the base station performs communication with the UE via the chosen beam. For example, as discussed supra, when the base station receives the feedback signal, the base station may select a beam out of the beams indicated in the feedback signal, and schedule DL communication with the UE based on the selected beam. For example, as discussed supra, the base station may select the beam based on the channel estimation of the beams indicated in the feedback signal. For example, as discussed supra, the base station may select the beam out of the beams indicated in the feedback signal based on the narrowband channel measurements of the beams.

Figure 17:
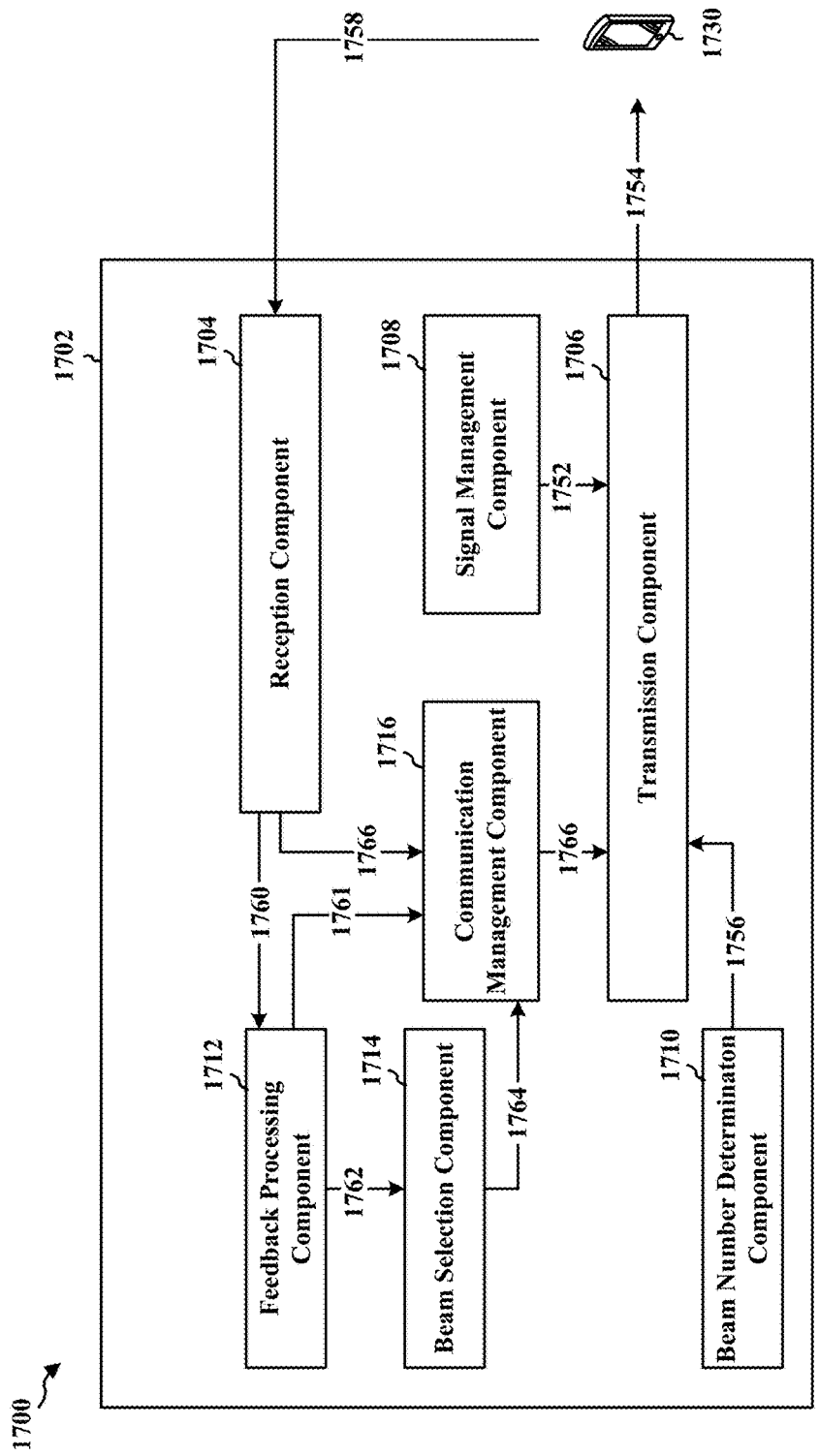
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a base station. The apparatus includes a reception component 1704, a transmission component 1706, a signal management component 1708, a beam number determination component 1710, a feedback processing component 1712, a beam selection component 1714, a communication management component 1716.

The signal management component 1708 transmits, to a UE (e.g., UE 1730), via the transmission component 1706 at 1752 and 1754, a plurality of signals through a plurality of beams of the base station, each of the plurality of beams corresponding to a respective antenna port of a plurality of antenna ports of the base station. In an aspect, the plurality of signals include a plurality of beam reference signals, a plurality of beam refinement reference signals, a plurality of CSI-RSs, or a combination thereof. In an aspect, the plurality of beam reference signals are transmitted during a synchronization subframe. In an aspect, the one or more beams are selected based on channel estimation for each beam of the plurality of beams and the channel estimation includes at least one of narrowband channel estimation or wideband channel estimation. In an aspect, the signal management component 1708 transmits the plurality of signals by sweeping through a plurality of directions in different symbols to transmit the plurality of signals.

The beam number determination component 1710 informs the UE, via the transmission component 1706, a number of beams whose information should be fed back to the base station from the UE, at 1756 and 1754. In an aspect, the beam number determination component 1710 informs the UE of the number of beams through RRC signaling or a PDCCH. In an aspect, one or more bits are reserved in DCI transmitted to the UE to inform the UE of the number of beams whose information should be fed back to the base station. In an aspect, the number of beams is determined based on whether the feedback signal is received via a PUCCH or a PUSCH. In such an aspect, In such an aspect, the number of beams whose information should be fed back is higher for feedback via the PUSCH than for feedback via the PUCCH. In an aspect, the number of beams is two. In such an aspect, a strongest beam of the two beams is used as an active beam for the UE and a weakest beam of the two beams is used as a candidate beam for the UE.

The feedback processing component 1712 receives, from the UE, via the reception component 1704 at 1758 and 1760, a feedback signal including information about one or more beams selected from the plurality of beams within one or more frequency bands. In an aspect, the feedback signal is received from the UE via at least one of a PUCCH or in UCI conveyed via a PUSCH. In an aspect, the feedback signal is received from the UE through a RACH subframe. The feedback processing component 1712 may forward the feedback signal to the communication management component 1716, at 1761, and to the beam selection component 1714, at 1762.

The communication management component 1716 may schedule resources for the UE on a PUSCH based on the feedback signal. In such an aspect, the feedback signal may further include one or more candidate uplink precoders, and the communication management component 1716 may schedule the PUSCH by: selecting a final uplink precoder from the one or more candidate uplink precoders, and scheduling the PUSCH based on the final uplink precoder. In such an aspect, the one or more candidate uplink precoders are from a predefined codebook.

The beam selection component 1714 may choose a beam among the one or more beams based on the feedback signal. The beam selection component 1714 may forward information about the chosen beam to the communication management component 1716, at 1764. The communication management component 1716 performs communication with the UE based on the feedback signal, via the transmission component 1706, at 1766 and 1754. In an aspect, the communication management component 1716 may perform communication with the UE via the chosen beam. The communication management component 1716 may also receive communication from the UE via the reception component 1704, at 1758 and 1766.

The apparatus may include additional components that perform each of the blocks of the algorithm in the aforementioned flowcharts of FIG. 16. As such, each block in the aforementioned flowcharts of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
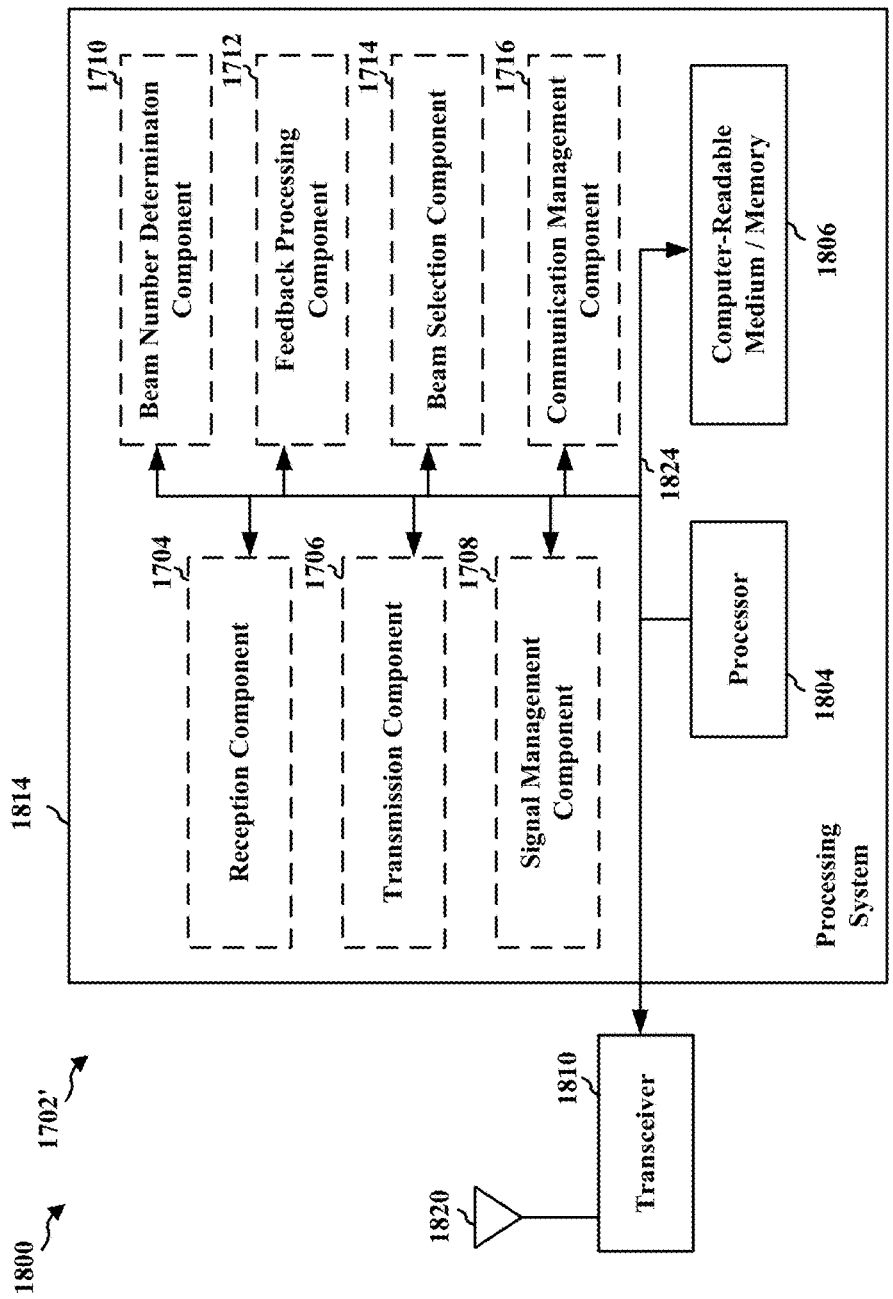
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, 1714, 1716, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712, 1714, 1716. The components may be software components running in the processor 1804, resident/stored in the computer readable medium/memory 1806, one or more hardware components coupled to the processor 1804, or some combination thereof. The processing system 1814 may be a component of the eNB 310 and may include the memory 376 and/or at least one of the TX processor 316, the RX processor 370, and the controller/processor 375.

In one configuration, the apparatus 1702/1702' for wireless communication includes means for transmitting, to a UE, a plurality of signals through a plurality of beams of the base station, each of the plurality of beams corresponding to a respective antenna port of a plurality of antenna ports of the base station, and means for receiving, from the UE, a feedback signal including information about one or more beams selected from the plurality of beams within one or more frequency bands. In an aspect, the means for transmitting the plurality of signals is configured to sweep through a plurality of directions in different symbols to transmit the plurality of signals. In an aspect, the apparatus 1702/1702' includes means for scheduling a PUSCH based on the feedback signal. In an aspect, the feedback signal further includes one or more candidate uplink precoders, and the means for scheduling the PUSCH is further configured to: select a final uplink precoder from the one or more candidate uplink precoders, and schedule the PUSCH based on the final uplink precoder. In an aspect, the apparatus 1702/1702' includes means for performing communication with the UE based on the feedback signal. In an aspect, the apparatus 1702/1702' includes means for choosing a beam among the one or more beams based on the feedback signal, where the communication with the UE is performed via the chosen beam. In an aspect, the apparatus 1702/1702' includes means for informing the UE a number of beams whose information should be fed back to the base station from the UE. In an aspect, the means for informing is configured to inform the UE of the number of beams through RRC signaling or a PDCCH.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   receiving, from a base station, a plurality of signals through a plurality of beams of the base station, each of the plurality of beams corresponding to a respective antenna port of a plurality of antenna ports of the base station;
   performing channel estimation for each beam of the plurality of beams from the plurality of antenna ports based on the plurality of signals
   selecting one or more candidate uplink precoders based on the channel estimation, the one or more candidate uplink precoders for use in scheduling a Physical Uplink Shared Channel (PUSCH); and
   transmitting, to the base station, a feedback signal including information about one or more beams selected from the plurality of beams, the feedback signal further including information about the selected one or more candidate uplink precoders.

2. The method of claim 1, wherein a millimeter wave (MMW) band is used for the wireless communications.

3. The method of claim 1, wherein the plurality of signals include a plurality of beam reference signals, a plurality of beam refinement reference signals, a plurality of channel state information reference signals (CSI-RS), or a combination thereof.

4. The method of claim 1, wherein the channel estimation includes at least one of narrowband channel estimation or wideband channel estimation.

5. The method of claim 1, wherein the channel estimation is based on a measurement of at least one of a signal-to-noise ratio, an antenna gain, or a reference signal measurement of each of the plurality of beams.

6. The method of claim 1, wherein the feedback signal is transmitted to the base station via at least one of a physical uplink control channel (PUCCH) or uplink control information (UCI) in a physical uplink shared channel (PUSCH).

7. The method of claim 1, wherein the feedback signal is transmitted to the base station through a random access channel (RACH) subframe.

8. A method of wireless communication by a base station, comprising:
   transmitting, to a user equipment (UE), a plurality of signals through a plurality of beams of the base station, each of the plurality of beams corresponding to a respective antenna port of a plurality of antenna ports of the base station;
   receiving, from the UE, a feedback signal including information about one or more beams selected from the plurality of beams and further including one or more candidate uplink precoders;
   selecting an uplink precoder from the one or more candidate uplink precoders; and
   scheduling a physical uplink shared channel (PUSCH) based on the selected uplink precoder.

9. The method of claim 8, wherein the one or more candidate uplink precoders are from a predefined codebook.

10. The method of claim 8, wherein a millimeter wave (MMW) band is used for the wireless communication.

11. The method of claim 8, wherein the plurality of signals include a plurality of beam reference signals, a plurality of beam refinement reference signals, a plurality of channel state information reference signals (CSI-RS), or a combination thereof.

12. The method of claim 8, wherein the channel estimation includes at least one of narrowband channel estimation and wideband channel estimation.

13. The method of claim 8, wherein the channel estimation is based on at least one of a signal-to-noise ratio, an antenna gain, or a reference signal measurement of each of the plurality of beams.

14. The method of claim 8, wherein the feedback signal is received from the UE via at least one of a physical uplink control channel (PUCCH) or in uplink control information (UCI) conveyed via a physical uplink shared channel (PUSCH).

15. The method of claim 8, wherein the feedback signal is received from the UE through a random access channel (RACH) subframe.

16. A user equipment (UE) for wireless communication, comprising:
   a memory; and
   at least one processor coupled to the memory and configured to:
      receive, from a base station, a plurality of signals through a plurality of beams of the base station, each of the plurality of beams corresponding to a respective antenna port of a plurality of antenna ports of the base station;
      perform channel estimation for each beam of the plurality of beams from the plurality of antenna ports based on the plurality of signals;
      select one of more candidate uplink precoders based on the channel estimation selecting one of more candidate uplink precoders from a predefined codebook based on the channel estimation, the one or more candidate uplink precoders for use in scheduling a Physical Uplink Shared Channel (PUSCH); and
      transmit, to the base station, a feedback signal including information about one or more beams selected from the plurality of beams, the feedback signal further including information about the selected one or more candidate uplink precoders.

17. The UE of claim 16, the one or more candidate uplink precoders are each a candidate for a precoder used for scheduling a physical uplink shared channel (PUSCH).

18. The UE of claim 16, wherein the plurality of signals include a plurality of beam reference signals, a plurality of beam refinement reference signals, a plurality of channel state information reference signals (CSI-RS), or a combination thereof.

19. The UE of claim 16, wherein a millimeter wave (MMW) band is used for the wireless communication.

20. A base station for wireless communication, comprising:
 a memory; and
 at least one processor coupled to the memory and configured to:
  transmit, to a user equipment (UE), a plurality of signals through a plurality of beams of the base station, each of the plurality of beams corresponding to a respective antenna port of a plurality of antenna ports of the base station;
  receive, from the UE, a feedback signal including information about one or more beams selected from the plurality of beams and further including one or more candidate uplink precoders;
  selecting an uplink precoder;
  and
  schedule a physical uplink shared channel (PUSCH) based on the selected uplink precoder.

21. The base station of claim 20, wherein the one or more candidate uplink precoders are from a predefined codebook.

22. The base station of claim 21, wherein a millimeter wave (MMW) band is used for the wireless communication.

23. The base station of claim 20, wherein the plurality of signals include a plurality of beam reference signals, a plurality of beam refinement reference signals, a plurality of channel state information reference signals (CSI-RS), or a combination thereof.

* * * * *